US012737713B2

(12) United States Patent
Melchor et al.

(10) Patent No.: US 12,737,713 B2
(45) Date of Patent: Sep. 15, 2026

(54) METHOD AND SYSTEM FOR STORING AND/OR TRANSPORTING TEMPERATURE-SENSITIVE MATERIALS

(71) Applicant: Cold Chain Technologies, LLC, Franklin, MA (US)

(72) Inventors: Henry Melchor, Woonsocket, RI (US); James Nilsen, Mays Landing, NJ (US); Benny Ledford, Spencer, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 0 days.

(21) Appl. No.: 17/726,318

(22) Filed: Apr. 21, 2022

(65) Prior Publication Data

US 2022/0343270 A1 Oct. 27, 2022

Related U.S. Application Data

(60) Provisional application No. 63/304,269, filed on Jan. 28, 2022, provisional application No. 63/183,245, (Continued)

(51) Int. Cl.
*G06Q 10/0832* (2023.01)

(52) U.S. Cl.
CPC ................................ *G06Q 10/0832* (2013.01)

(58) Field of Classification Search
CPC .......... G06Q 10/0832; F25D 2303/084; F25D 2303/0843; F25D 3/00; B65D 81/18; (Continued)

(56) References Cited

U.S. PATENT DOCUMENTS 1,843,038 A 1/1932 McIlvain
2,034,114 A 3/1936 Moody
(Continued)

FOREIGN PATENT DOCUMENTS

CN 204822615 U 12/2015
CN 205312237 U 6/2016
(Continued)

OTHER PUBLICATIONS

English Machine Translation of FR-2267255-A1 (Year: 1975).*
(Continued)

*Primary Examiner* — Laura E. Parker
(74) *Attorney, Agent, or Firm* — KRIEGSMAN & KRIEGSMAN

(57) ABSTRACT

Methods and systems for maintaining temperature-sensitive materials within a desired temperature range for a period of time. In one embodiment, the system includes an insulated base having a rectangular cavity bounded by a bottom wall and four side walls, the insulated base being positioned within an outer box. A sleeve is snugly but removably positioned in the cavity of the insulated base, the sleeve being generally rectangular but being offset by 45 degrees relative to the insulated base, whereby the sleeve and the insulated base jointly form four discrete generally triangular cavities. Pelletized dry ice may be disposed within each of the cavities. A guide having one end positioned over the sleeve and another end mating with the insulated base may be used to prevent the sleeve from rotating relative to the insulated base. Additional pelletized dry ice may be positioned in a tray mounted on top of the guide.

39 Claims, 41 Drawing Sheets

Related U.S. Application Data filed on May 3, 2021, provisional application No. 63/177,755, filed on Apr. 21, 2021.

(58) Field of Classification Search

CPC ............ B65D 81/3823; B65D 81/3862; B65D 81/022; B65D 81/053; B65D 81/057

USPC ....... 220/1.5, 592.01, 592.2, 592.23, 592.24, 220/592.25, 592.26; 206/521; 62/457.1, 62/463

See application file for complete search history.

(56) References Cited

U.S. PATENT DOCUMENTS 2,289,060 A 7/1942 Merkle
2,528,715 A 11/1950 Wagner
3,365,092 A 1/1968 Blessing
3,810,367 A 5/1974 Peterson
4,134,276 A 1/1979 Lampard
4,145,895 A 3/1979 Hjertstrand et al.
4,294,079 A 10/1981 Benson
4,344,301 A 8/1982 Taylor
4,498,312 A 2/1985 Schlosser
4,576,017 A 3/1986 Combs et al.
4,614,091 A 9/1986 Frank et al.
4,682,708 A 7/1987 Pool
5,598,713 A 2/1997 Bartilucci
5,671,611 A 9/1997 Quigley
5,899,088 A 5/1999 Purdum
5,924,302 A 7/1999 Derifield
5,979,693 A 11/1999 Bane, III
6,116,042 A 9/2000 Purdum
6,189,330 B1 2/2001 Retallick et al.
6,244,458 B1 6/2001 Frysinger et al.
6,295,830 B1 10/2001 Newman
6,349,559 B1 2/2002 Hasanovic
6,482,332 B1 11/2002 Malach
6,574,983 B2 6/2003 Smith et al.
6,584,797 B1 7/2003 Smith et al.
6,668,577 B2 12/2003 Quenedey
6,755,568 B2 6/2004 Malone et al.
6,868,982 B2 * 3/2005 Gordon ............. B65D 81/3823 220/592.25
6,875,486 B2 4/2005 Miller
7,140,768 B2 11/2006 Prabhakar
7,225,632 B2 6/2007 Derifield
7,257,963 B2 8/2007 Mayer
7,607,540 B2 10/2009 Ballard
7,624,873 B2 12/2009 Tennant et al.
7,681,405 B2 3/2010 Williams
7,849,708 B2 12/2010 Goncharko et al.
8,074,465 B2 12/2011 Heroux et al.
8,152,367 B2 4/2012 Roberts et al.
8,176,749 B2 5/2012 Lamere et al.
8,250,882 B2 8/2012 Mustafa et al.
8,292,119 B2 10/2012 Kenneally
8,499,533 B2 8/2013 Emond et al.
8,567,211 B2 10/2013 Al-Rasheed
8,580,369 B2 11/2013 Emond et al.
8,607,581 B2 12/2013 Williams et al.
8,613,202 B2 12/2013 Williams
8,863,546 B2 10/2014 Oberweis
8,887,515 B2 11/2014 Patstone
8,904,810 B2 12/2014 Schabron et al.
8,938,986 B2 1/2015 Matta et al.
9,045,278 B2 6/2015 Mustafa et al.
9,060,508 B2 6/2015 Anti et al.
9,139,319 B2 9/2015 Crespo et al.
9,180,998 B2 11/2015 Banks et al.
9,366,469 B2 6/2016 Chapman, Jr.
9,429,350 B2 8/2016 Chapman, Jr.
9,556,373 B2 1/2017 Formato et al.
9,598,622 B2 3/2017 Formato et al.
9,689,602 B2 6/2017 Emond et al.
9,834,365 B2 12/2017 Pointer et al.
9,909,797 B2 3/2018 Van Wuffen
9,944,449 B2 4/2018 Wood et al.
9,957,099 B2 5/2018 White et al.
9,963,287 B2 5/2018 Vogel et al.
9,994,385 B2 6/2018 Dudi et al.
10,046,901 B1 8/2018 Jobe
10,077,389 B2 9/2018 Formato et al.
10,119,741 B2 11/2018 Jackson et al.
10,168,090 B1 1/2019 Chapman, Jr.
10,253,918 B2 4/2019 McCormick
10,273,073 B2 4/2019 Collison
10,279,991 B2 5/2019 Roger et al.
10,309,709 B2 6/2019 Emond et al.
10,443,918 B2 10/2019 Li et al.
10,457,469 B2 10/2019 Tumber et al.
10,583,978 B2 3/2020 Longley et al.
10,604,326 B2 3/2020 Longley et al.
10,618,695 B2 * 4/2020 McCormick ....... B65D 81/3813
10,661,969 B2 5/2020 Pranadi et al.
10,766,685 B2 9/2020 Kuhn et al.
10,767,915 B2 9/2020 Wickline
10,829,675 B2 11/2020 Formato et al.
10,899,529 B2 1/2021 MokhtarzadehBahadorani
10,941,977 B2 3/2021 Waltermire et al.
10,962,270 B2 3/2021 Jain et al.
11,078,008 B2 8/2021 Dankbaar et al.
11,085,688 B2 8/2021 Seo et al.
11,130,622 B2 9/2021 Goellner
11,137,190 B2 10/2021 Martino
11,340,005 B2 5/2022 Nilsen et al.
11,518,602 B2 12/2022 Knight
12,172,820 B2 12/2024 Lantz
2002/0124588 A1 * 9/2002 Quenedey ............... F25D 3/125 62/384
2003/0160092 A1 * 8/2003 Philips ................. B65D 77/065 229/122.32
2003/0217948 A1 * 11/2003 Lantz ................. B65D 81/3862 206/591
2005/0178142 A1 8/2005 Perry et al.
2005/0189404 A1 9/2005 Xiaohai et al.
2006/0053828 A1 3/2006 Shallman et al.
2006/0218963 A1 10/2006 Elias
2007/0051782 A1 3/2007 Lantz
2007/0084232 A1 4/2007 Whewell
2008/0223066 A1 9/2008 Henderson et al.
2008/0292220 A1 11/2008 Zacchi
2009/0001086 A1 1/2009 Roderick et al.
2009/0179541 A1 7/2009 Smith et al.
2009/0230139 A1 9/2009 Li
2010/0162734 A1 7/2010 McCormick et al.
2010/0289669 A1 11/2010 Saltzman et al.
2011/0290792 A1 12/2011 Krzak et al.
2012/0248101 A1 * 10/2012 Tumber .................... F25D 3/08 53/473
2013/0020309 A1 1/2013 Tattam et al.
2013/0055750 A1 * 3/2013 Mustafa ............. B65D 81/3862 220/592.2
2013/0228583 A1 9/2013 Mayer
2014/0059978 A1 3/2014 Bolejack et al.
2014/0138392 A1 * 5/2014 McCormick ........... B65D 25/10 220/592.2
2015/0251758 A1 9/2015 Vandyke et al.
2015/0285548 A1 10/2015 Emond et al.
2016/0297606 A1 10/2016 Roger et al.
2016/0304267 A1 * 10/2016 Aksan ................ B65D 81/3862
2016/0362240 A1 12/2016 Ferracamo, Jr.
2017/0001785 A1 1/2017 Ripley et al.
2017/0121097 A1 5/2017 Pranadi et al.
2017/0198959 A1 7/2017 Morris
2017/0245486 A1 8/2017 Larson et al.
2017/0305632 A1 10/2017 Brown
2017/0350635 A1 12/2017 Thirumurugavel
2018/0093816 A1 4/2018 Longley et al.
2018/0100682 A1 4/2018 Nilsen et al.
2018/0134427 A1 5/2018 Fallgren
2018/0194535 A1 7/2018 Collison
2018/0320947 A1 11/2018 Jain et al.
2018/0328644 A1 * 11/2018 Rizzo .................... F25D 11/003
2018/0347887 A1 12/2018 Kenneally

(56) References Cited

U.S. PATENT DOCUMENTS

| | | | | |
|---|---|---|---|---|
| 2018/0353379 | A1 | 12/2018 | Chou et al. | |
| 2019/0210790 | A1 | 7/2019 | Rizzo et al. | |
| 2019/0226744 | A1 | 7/2019 | Wood et al. | |
| 2020/0002075 | A1 * | 1/2020 | Lee | B65D 77/06 |
| 2020/0047993 | A1 | 2/2020 | Brabbs et al. | |
| 2020/0122909 | A1 * | 4/2020 | Jobe | B65D 81/386 |
| 2020/0189830 | A1 | 6/2020 | Tumber et al. | |
| 2020/0206082 | A1 | 7/2020 | Ferracamo Jr. | |
| 2020/0231362 | A1 | 7/2020 | Kulangara et al. | |
| 2020/0307896 | A1 | 10/2020 | Pranadi et al. | |
| 2020/0324959 | A1 | 10/2020 | Longley et al. | |
| 2020/0331686 | A1 | 10/2020 | Longley et al. | |
| 2020/0346840 | A1 | 11/2020 | Munie et al. | |
| 2020/0378676 | A1 | 12/2020 | Rowe et al. | |
| 2020/0408453 | A1 | 12/2020 | Martino | |
| 2021/0016955 | A1 | 1/2021 | Morine et al. | |
| 2021/0024270 | A1 | 1/2021 | Mirzaee Kakhki | |
| 2021/0070539 | A1 | 3/2021 | Chasteen et al. | |
| 2021/0253292 | A1 | 8/2021 | Grifferos Reyes | |
| 2021/0253330 | A1 | 8/2021 | Madanagopal et al. | |
| 2021/0254877 | A1 | 8/2021 | Massenzo et al. | |
| 2021/0292630 | A1 | 9/2021 | Formato et al. | |
| 2021/0300665 | A1 | 9/2021 | Melchor | |
| 2021/0309442 | A1 | 10/2021 | Kletzel et al. | |
| 2021/0331834 | A1 | 10/2021 | Longley et al. | |
| 2022/0002070 | A1 | 1/2022 | Moghaddas et al. | |
| 2022/0194682 | A1 | 6/2022 | Michel et al. | |
| 2022/0265514 | A1 | 8/2022 | Blezard et al. | |
| 2022/0267081 | A1 | 8/2022 | Conway et al. | |
| 2022/0267657 | A1 | 8/2022 | Blezard et al. | |
| 2022/0281671 | A1 | 9/2022 | Lee et al. | |
| 2022/0325938 | A1 | 10/2022 | Nilsen et al. | |
| 2022/0333840 | A1 | 10/2022 | Chasteen et al. | |
| 2022/0352593 | A1 | 11/2022 | Inoue et al. | |
| 2023/0227236 | A1 | 7/2023 | Nilsen et al. | |
| 2023/0257185 | A1 | 8/2023 | Goellner et al. | |
| 2024/0142153 | A1 | 5/2024 | Emond et al. | |

FOREIGN PATENT DOCUMENTS

| | | | | |
|---|---|---|---|---|
| CN | 210479596 | U | 5/2020 | |
| EP | 0940352 | A2 | 9/1999 | |
| EP | 2179648 | B1 | 12/2014 | |
| EP | 2883812 | B1 | 1/2018 | |
| EP | 3112289 | B1 | 12/2018 | |
| EP | 3090961 | B1 | 2/2019 | |
| EP | 3270709 | B1 | 5/2019 | |
| EP | 3601095 | B1 | 4/2021 | |
| FR | 2267255 | A1 * | 7/1975 | |
| GB | 2566792 | A | 3/2019 | |
| WO | WO-0144731 | A1 * | 6/2001 | B65D 81/3827 |
| WO | 2010044107 | A2 | 4/2010 | |
| WO | 2014125878 | A1 | 8/2014 | |
| WO | 2018213348 | A2 | 11/2018 | |
| WO | 2019059585 | A1 | 3/2019 | |
| WO | 2019079186 | A1 | 4/2019 | |
| WO | 2019091581 | A1 | 5/2019 | |
| WO | 2020157488 | A1 | 8/2020 | |
| WO | 2020193872 | A1 | 10/2020 | |
| WO | 2021165698 | A1 | 8/2021 | |

OTHER PUBLICATIONS

International Search Report mailed Aug. 2, 2022, in corresponding PCT Application No. PCT/US22/25817.

Written Opinion mailed Aug. 2, 2022, in corresponding PCT Application No. PCT/US22/25817.

"evo DI dry ice smart shipper" biolifesolutions.com, accessed Dec. 28, 2021, https://www.biolifesolutions.com/cold-chain-management/evo-dry-ice-shippers/.

"Sherpa Systems Dry Ice" pelibiothermal.com Oct. 13, 2021, https://pelibiothermal.com/products/sherpa-systems-dry-ice.

"Ex-Temp Validated Boxes" marathonproducts.com Nov. 13, 2017, https://marathonproducts.com/product/ex-temp-shipping-boxes/#1483571719208-13178a46-84e6.

"Evertemp Urethane Insulated Shipping Containers" coldice.com Feb. 17, 2015, https://www.coldice.com/insulated_shipping_containers/.

"Thermosafe Multi-Purpose Dry Ice Mailers," thomassci.com. Accessed: Dec. 16, 2021. https://web.archive.org/web/20211216000810/https://www.thomassci.com/Laboratory-Supplies/Mailers/_/MULTI-PURPOSE-DRY-ICE-MAILERS?q=Dry+Ice+Container.

"Polar Tech," polar-tech.com. Accessed: Dec. 16, 2021. https://web.archive.org/web/20211216011453/https://www.polar-tech.com/wp-content/uploads/2019/10/Science_catalog.pdf.

"STS Frozen Parcel Family," coldchaintech.com. Apr. 15, 2016. https://web.archive.org/web/20160415191312/http://www.coldchaintech.com/product-details/sts/.

"Passive Packaging Solutions—Va-Q-tainer," fedex.com. Accessed: Dec. 16, 2021. https://web.archive.org/web/20211216005634/https://www.fedex.com/en-cn/shipping/industry-solutions/healthcare/temperature-control.html.

"Frozen Shippers GTS Extreme Family," coldchaintech.com. Jun. 12, 2016. https://web.archive.org/web/20160612102223/http://www.coldchaintech.com:80/product-details/gts-extreme.

"Dry ice storage containers," ddbiolab.com. Accessed: Dec. 16, 2021. https://web.archive.org/web/20211216002005/https://www.ddbiolab.com/frontoffice/product?produitld=Jan. 17, 2018.

"CRYOBOXX," cryoboxx.com. Accessed: Dec. 16, 2021. https://web.archive.org/web/20211216002709/https://www.cryoboxx.com/en/cryoboxx/.

"Initial International," sofrigam.com., Accessed: Nov. 17, 2022, https://sofrigam.com/en/product/89-initial-international.

"Therapak EPS (Expanded Polystyrene) Insulated Shippers for Refrigerated andFrozen Specimen Shipment," herapak.com. Jul. 28, 2018. https://web.archive.org/web/20180728115104/https://therapak.com/catalog/insulated-shippers/.

Mei et al., "Impact of Excessive Sublimation Cooling on the Internal Temperature of Passive Shippers Cooled by Dry ce," PDA Journal of Pharmaceutical Science and Technology, 74(1):49-57 (2019).

Chern et al., "Root Cause for Near −90° C. Excursions in Passive Shippers with Dry Ice as the Coolant," Amgen, IQPC Chicago (2017).

U.S. Appl. No. 17/842,544, inventors Anthony Rizzo et al., filed Jun. 16, 2022.

U.S. Appl. No. 16/246,435, inventors James Robert Chasteen et al., filed Jan. 11, 2019.

U.S. Appl. No. 16/827,086, inventors Dawn E. Smith et al., filed Mar. 23, 2020.

U.S. Appl. No. 17/891,631, inventors Heather M. Conway et al., filed Aug. 19, 2022.

U.S. Appl. No. 17/668,569, inventors William C. Blezard et al., filed Feb. 10, 2022.

U.S. Appl. No. 17/668,610 inventors William C. Blezard et al., filed Feb. 10, 2022.

U.S. Appl. No. 17/508,418 inventors William C. Blezard et al., filed Oct. 22, 2021.

U.S. Appl. No. 17/508,447 inventors William C. Blezard et al., filed Oct. 22, 2021.

Pack-out Sheet for CCT STS-U186-DIUL Shipping System, Cold Chain Technologies, Franklin, MA (2011).

U.S. Appl. No. 18/628,646, inventors James R. Chasteen et al., filed Apr. 5, 2024.

Pack-out Sheet for Novartis GTS-77 Shipping System, Cold Chain Technologies, Franklin, MA (2011).

Pack-out Sheet for GTS-77 Shipping System, Cold Chain Technologies, Franklin, MA (2010).

WSFA 12 News Staff web page entitled "2 trays of Covid-19 vaccines sent to Alabama returned due to temperature drop," (2020); https://www.wsfa.com/2020/12/16/trays-covid-vaccines-sent-alabama-returned-due-temperature-drop/, accessed Feb. 6, 2024.

Biocair, Inc. web page entitled "What causes some dry ice shipments to reach −90.C?" (2017); https://www.biocair.com/latest/news/what-causes-some-dry-ice-shipments-to-reach-90-c, accessed Feb. 7, 2024.

(56) References Cited

OTHER PUBLICATIONS

Web page for TTx Thermal Inserts, The Illuminate Group, Tampa, Florida; https://theilluminategroup.com/products/ttx-thermal-packages/, accessed Feb. 7, 2024.
"Packaging Perishable Shipments," FedEx Corporation, Memphis, TN (2019).
Web page entitled "How to ship perishables," FedEx Corporation, Memphis, TN; https://www.fedex.com/en-us/shipping/how-to-ship-perishables.html, accessed Feb. 7, 2024.
Web page entitled "How Do I Ship Dry Ice," ShipStation, Austin, TX (2022); https://www.shipstation.com/blog/how-do-i-ship-dry-ice/, accessed Feb. 7, 2024.
Web page for Sub-Zero Ice Services, Miami, FL; https://subzeroiceservices.com/, accessed Feb. 7, 2024.
Web page for CrystalandCory.com; https://crystalandcomp.com/nutrisystem-frozen-food-delivery/, accessed Feb. 7, 2024.
Web page entitled "What Format of Dry Ice Does Your Home Delivery Logistics Need?"; https://www.just-food.com/contractors/cleaning-products-hygiene/cold-jet/pressreleases/format-dry-ice/, accessed Feb. 7, 2024.

* cited by examiner

241

351

351

353

351

METHOD AND SYSTEM FOR STORING AND/OR TRANSPORTING TEMPERATURE-SENSITIVE MATERIALS

CROSS-REFERENCE TO RELATED APPLICATIONS

The present application claims the benefit under 35 U.S.C. 119(e) of U.S. Provisional Patent Application No. 63/177,755, inventors Henry Melchor et al., filed Apr. 21, 2021, U.S. Provisional Patent Application No. 63/183,245, inventors Henry Melchor et al., filed May 3, 2021, and of U.S. Provisional Patent Application No. 63/304,269, inventor Henry Melchor et al., filed Jan. 28, 2022, the disclosures of all of which are incorporated herein by reference in their entireties.

BACKGROUND OF THE INVENTION

The present invention relates generally to methods and systems for maintaining temperature-sensitive materials within a desired temperature range for a period of time and relates more particularly to a novel method and system for maintaining temperature-sensitive materials within a desired temperature range for a period of time.

There is a continuing need for systems that can maintain temperature-sensitive materials within a desired temperature range for an extended period of time. For example, many pharmaceuticals, biological materials, medical devices, foods, beverages, and other temperature-sensitive materials must be maintained within a particular temperature range (such as, for example, −90° C. to −60° C.; −25° C. to −15° C.; +2° C. to +8° C.; +15° C. to +25° C.) in order to prevent the spoilage of such materials. As can readily be appreciated, the maintenance of such materials within a desired temperature range while such materials are being transported and/or stored can be challenging. One way in which such temperature maintenance may be achieved is by transporting and/or storing such materials in active temperature-control devices, such as electrically-powered refrigeration units or the like. However, as can be appreciated, such active temperature-control devices add considerable expense to transportation and/or storage costs.

An alternative approach to temperature maintenance during transportation and/or storage is to place the temperature-sensitive materials within an insulated container that also contains one or more passive temperature-control members, such as, but not limited to, ice packs, gel packs, dry ice, wet ice, or the like. In some cases, such as where the passive temperature-control member is an ice pack or a gel pack, the passive temperature-control member typically comprises a quantity of a phase-change material (PCM) disposed within a suitable casing or container. In other cases, such as where the passive temperature-control member is dry ice or wet ice, the passive temperature-control member may be loose within the insulated container. Often, the temperature-sensitive materials are housed within a product box (sometimes alternatively referred to as "a payload box") that, in turn, is housed within the insulated container. The product box, which is typically made of a corrugated cardboard or similar material, is typically shaped to have four sides, a top, and a bottom defining a uniform rectangular prismatic cavity.

Documents that may be of interest may include the following, all of which are incorporated herein by reference: U.S. Pat. No. 10,766,685 B2, inventors Kuhn et al., which issued Sep. 8, 2020; U.S. Pat. No. 10,309,709 B2, inventors Emond et al., which issued Jun. 4, 2019; U.S. Pat. No. 9,944,449 B2, inventors Wood et al., which issued Apr. 17, 2018; U.S. Pat. No. 9,689,602 B2, inventors Emond et al., which issued Jun. 27, 2017; U.S. Pat. No. 9,429,350 B2, inventor Chapman, Jr., which issued Aug. 30, 2016; U.S. Pat. No. 9,366,469 B2, inventor Chapman, Jr., which issued Jun. 14, 2016; U.S. Pat. No. 9,180,998 B2, inventors Banks et al., which issued Nov. 10, 2015; U.S. Pat. No. 9,045,278 B2, inventors Mustafa et al., which issued Jun. 2, 2015; U.S. Pat. No. 8,938,986 B2, inventors Matta et al., which issued Jan. 27, 2015; U.S. Pat. No. 8,887,515 B2, inventor Patstone, which issued Nov. 18, 2014; U.S. Pat. No. 8,613,202 B2, inventor Williams, which issued Dec. 24, 2013; U.S. Pat. No. 8,607,581 B2, inventors Williams et al., which issued Dec. 17, 2013; U.S. Pat. No. 8,250,882 B2, inventors Mustafa et al., which issued Aug. 28, 2012; U.S. Pat. No. 8,074,465 B2, inventors Heroux et al., which issued Dec. 13, 2011; U.S. Pat. No. 7,849,708 B2, inventor Goncharko et al., which issued Dec. 14, 2010; U.S. Pat. No. 7,257,963 B2, inventor Mayer, which issued Aug. 21, 2007; U.S. Pat. No. 6,875,486 B2, inventor Miller, which issued Apr. 5, 2005; U.S. Pat. No. 6,868,982 B2, inventor Gordon, which issued Mar. 22, 2005; U.S. Pat. No. 6,482,332 B1, inventor Malach, which issued Nov. 19, 2002; U.S. Pat. No. 6,116,042, inventor Purdum, which issued Sep. 12, 2000; U.S. Pat. No. 5,924,302, inventor Derifield, which issued Jul. 20, 1999; U.S. Pat. No. 5,899,088, inventor Purdum, which issued May 4, 1999; U.S. Patent Application Publication No. US 2021/0024270 A1, inventor Mirzaee Kakhki, which published Jan. 28, 2021; U.S. Patent Application Publication No. US 2020/0408453 A1, inventor Martino, which published Dec. 31, 2020; U.S. Patent Application Publication No. 2020/0231362 A1, inventors Kulangara et al., which published Jul. 23, 2020; U.S. Patent Application Publication No. US 2020/0002075, inventors Lee et al., which published Jan. 2, 2020; U.S. Patent Application Publication No. 2019/0210790 A1, inventors Rizzo et al., which published Jul. 11, 2019; U.S. Patent Application No. US 2018/0328644 A1, inventors Rizzo et al., which published Nov. 15, 2018; U.S. Patent Application Publication No. US 2018/0320947 A1, inventors Jain et al., which published Nov. 8, 2018; U.S. Patent Application Publication No. US 2018/0100682 A1, inventors Nilsen et al., which published Apr. 12, 2018; U.S. Patent Application Publication No. US 2018/0093816 A1, inventors Longley et al., which published Apr. 5, 2018; U.S. Patent Application Publication No. US 2017/0121097 A1, inventors Pranadi et al., which published May 4, 2017; U.S. Patent Application Publication No. US 2016/0362240 A1, inventors Ferracamo, Jr., which published Dec. 15, 2016; U.S. Patent Application Publication No. US 2011/0290792 A1, inventors Krzak et al., which published Dec. 1, 2011; PCT International Publication No. WO 2018/213348 A2, which published Nov. 22, 2018.

SUMMARY OF THE INVENTION

It is an object of the present invention to provide a novel shipping system for maintaining temperature-sensitive materials within a desired temperature range for a period of time.

According to one aspect of the invention, there is provided a system for maintaining temperature-sensitive materials within a desired temperature range for a period of time, the system comprising (a) an insulated base, the insulated base comprising a first cavity; (b) a divider, the divider positioned within the first cavity of the insulated base, the divider dividing the first cavity into a second cavity and a plurality of third cavities, the second cavity being centered within the first cavity, the third cavities surrounding the second cavity, the third cavities being triangular in horizontal cross-section and substantially equal in volume to one another; and (c) a quantity of phase-change material disposed within each of the plurality of third cavities.

In a more detailed feature of the invention, the divider may comprise a sleeve, and the sleeve may be rotationally offset relative to the insulated base.

In a more detailed feature of the invention, the sleeve may be rotationally offset relative to the insulated base by about 45 degrees.

In a more detailed feature of the invention, the sleeve may be rotationally offset relative to the insulated base by about 22 degrees.

In a more detailed feature of the invention, the first cavity may be generally square in horizontal cross-sectional shape.

In a more detailed feature of the invention, the sleeve may have a generally square profile, with beveled corners, in horizontal cross-section.

In a more detailed feature of the invention, the sleeve and the insulated base may be dimensioned so that at least some of the beveled corners of the sleeve contact the insulated base.

In a more detailed feature of the invention, the sleeve and the insulated base may be dimensioned so that all of the beveled corners of the sleeve contact the insulated base.

In a more detailed feature of the invention, the divider may further comprise a base, and the base may be coupled to a bottom of the sleeve.

In a more detailed feature of the invention, the insulated base may comprise a plurality of side walls, and the base of the divider may be dimensioned to contact at least one of the side walls of the insulated base.

In a more detailed feature of the invention, the base of the divider may be dimensioned to contact all of the side walls of the insulated base.

In a more detailed feature of the invention, the system may further comprise a guide, and the guide may be coupled to the sleeve and to the insulated base in such a way as to inhibit the sleeve from rotating relative to the insulated base.

In a more detailed feature of the invention, the insulated base may comprise a plurality of side walls, the guide may comprise a top panel, and the top panel may be dimensioned to engage at least one of the side walls of the insulated base.

In a more detailed feature of the invention, the top panel may be dimensioned to engage all of the side walls of the insulated base.

In a more detailed feature of the invention, the guide may further comprise a bottom panel, and the bottom panel may be dimensioned to engage two of the side walls of the insulated base.

In a more detailed feature of the invention, the system may further comprise an outer box, and the insulated base may be disposed within the outer box.

In a more detailed feature of the invention, the outer box may be formed from a sheet of material of a given thickness, the outer box may comprise a plurality of top closure flaps, and at least some of the top closure flaps may be folded over and secured to themselves to have a doubled thickness.

In a more detailed feature of the invention, the system may further comprise a lid assembly, the lid assembly may comprise a lid and a top pad, the lid may be dimensioned for covering the first cavity, the top pad may be secured to an exterior of the lid, and the top pad may have at least one cutout.

In a more detailed feature of the invention, the at least one cutout may comprise a handle for use in mounting/removing the lid assembly.

In a more detailed feature of the invention, the at least one cutout may comprise an opening for receiving a data logger and wire.

In a more detailed feature of the invention, the system may further comprise an outer box, the outer box may comprise an interior cavity and at least one top closure flap, the insulated base may be disposed within the interior cavity of the outer box, and the lid assembly may be removably secured to one of the at least one top closure flap.

In a more detailed feature of the invention, the system may further comprise an outer box and a baffle, the insulated base may be disposed within the baffle, and the baffle and the insulated base may be disposed within the outer box.

In a more detailed feature of the invention, the insulated base may comprise a bottom, a plurality of sides, and an open top, and the baffle may be dimensioned to cover substantially all of the bottom and the plurality of sides of the insulated base.

In a more detailed feature of the invention, the baffle may not cover any of the open top of the insulated base.

In a more detailed feature of the invention, the system may further comprise a lid assembly, the lid assembly may be removably mounted over the open top of the insulated base, and the baffle may be further dimensioned to cover at least a portion, but not an entirety, of the lid assembly when the lid assembly is mounted over the open top of the insulated base.

In a more detailed feature of the invention, the system may further comprise a foam pad, and the foam pad may be positioned within the outer box below the baffle.

In a more detailed feature of the invention, the phase-change material may comprise dry ice pellets.

In a more detailed feature of the invention, the system may further comprise a tray and an additional quantity of phase-change material disposed within the tray, and the tray may be removably mounted within the insulated base over the divider.

In a more detailed feature of the invention, the additional quantity of phase-change material may comprise dry ice pellets.

In a more detailed feature of the invention, the tray may be shaped to include a pair of integrally-formed handles.

In a more detailed feature of the invention, the tray may comprise a bottom wall and a plurality of side walls, and the side walls may include recesses to facilitate nesting of a plurality of the trays when not in use.

According to another aspect of the invention, there is provided a system for maintaining temperature-sensitive materials within a desired temperature range for a period of time, the system comprising (a) an insulated base, the insulated base comprising a first cavity of generally rectangular shape in horizontal cross-section; (b) a divider, the divider positioned within the first cavity of the insulated base, the divider comprising a sleeve, the sleeve being generally rectangular in horizontal cross-section, the sleeve being offset rotationally relative to the insulated base and in direct contact with the insulated base to divide the first cavity into a central cavity and a plurality of peripheral cavities; and (c) a quantity of dry ice disposed within each of the plurality of third cavities.

In a more detailed feature of the invention, the first cavity may be generally square in horizontal cross-section, the sleeve may be generally square in horizontal cross-section, and the peripheral cavities may be generally triangular in horizontal cross-section and generally equal in volume to one another.

In a more detailed feature of the invention, the sleeve may have beveled corners, and the beveled corners may be in direct contact with the insulated base.

According to still another aspect of the invention, there is provided a system for use in maintaining temperature-sensitive materials within a desired temperature range for a period of time, the system comprising (a) an insulated base, the insulated base comprising a first cavity; and (b) a divider, the divider positioned within the first cavity of the insulated base, the divider dividing the first cavity into a second cavity and a plurality of third cavities, the second cavity being centered within the first cavity, the third cavities surrounding the second cavity, the third cavities being triangular in horizontal cross-section and substantially equal in volume to one another.

In a more detailed feature of the invention, the system may further comprise an outer box, and the insulated base may be disposed within the outer box.

In a more detailed feature of the invention, the system may further comprise a baffle, the baffle may be disposed within the outer box, and the insulated base may be disposed within the baffle.

In a more detailed feature of the invention, the system may further comprise a lid, and the lid may removably cover the insulated base.

In a more detailed feature of the invention, the system may further comprise a tray, and the tray may be disposed within the insulated base over the divider.

In a more detailed feature of the invention, the system may further comprise a guide, and the guide may be disposed within the insulated base between the tray and the divider.

The present invention is also directed at methods of making and using the aforementioned shipping system.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions or may be shown in a simplified form for purposes of explication. In the drawings wherein like reference numerals represent like parts.

DETAILED DESCRIPTION OF THE INVENTION

Figure 1:
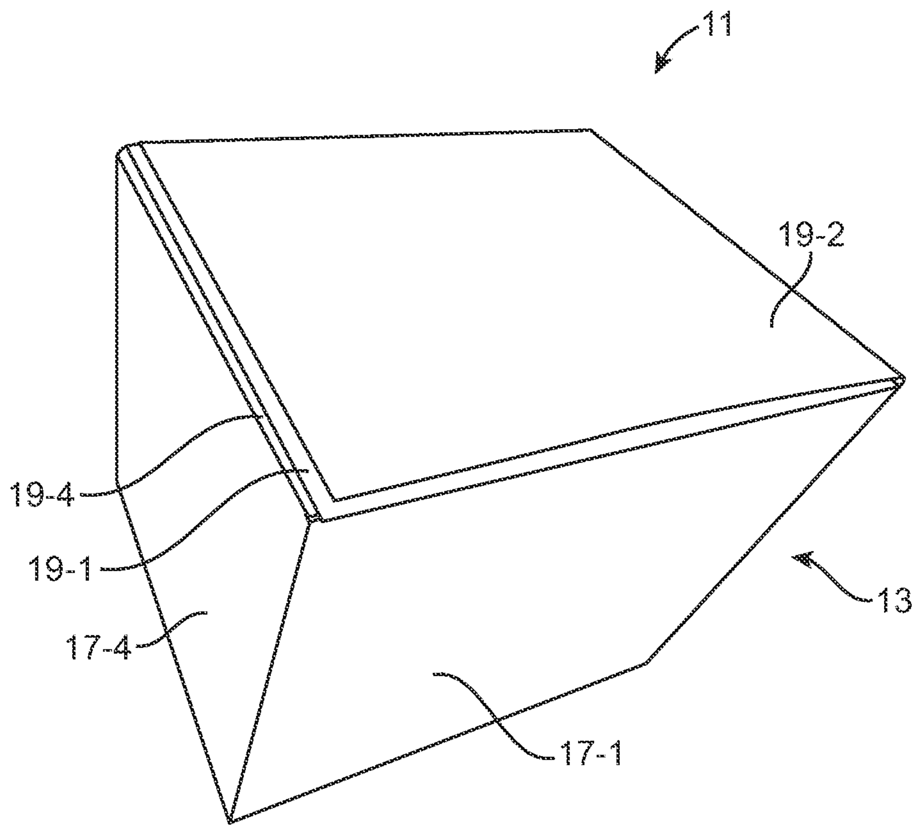
FIG. 1 is a perspective view of a first embodiment of a shipping system for maintaining temperature-sensitive materials within a desired temperature range for a period of time, the shipping system being constructed according to the present invention.
Figure 2:
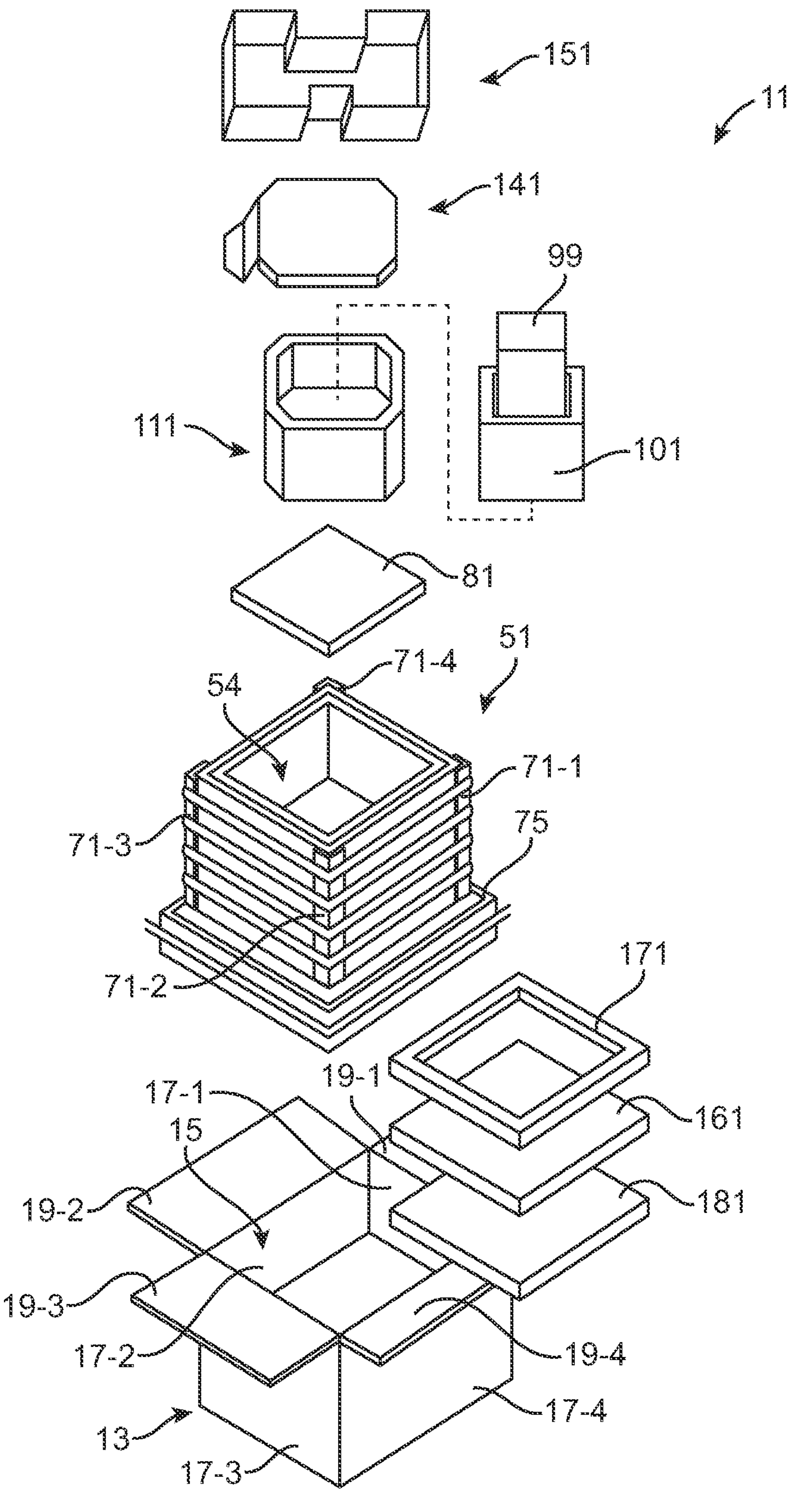
FIG. 2 is a fragmentary partly exploded perspective view of the shipping system of FIG. 1, the pelletized dry ice of the system not being shown.

Referring now to FIGS. 1 and 2, there are shown perspective and fragmentary partly exploded perspective views, respectively, of a first embodiment of a shipping system for maintaining temperature-sensitive materials within a desired temperature range for a period of time, the shipping system being constructed according to the present invention and being represented generally by reference numeral 11. Details of shipping system 11 that are discussed elsewhere in this application or that are not critical to an understanding of the invention may be omitted from one or more of FIGS. 1 and 2 and/or from the accompanying description herein or may be shown in one or more of FIGS. 1 and 2 and/or described herein in a simplified manner.

System 11 may be used to maintain a payload within a desired temperature range for an extended period of time, such as several hours up to a few days or longer. In the present embodiment, system 11 may be configured to maintain a parcel-sized payload within a temperature range of about −90° C. to −60° C. for an extended period of time; however, it is to be understood that system 11 need not be limited to parcel-sized payloads and/or that system 11 need not be limited to a temperature range of about −90° C. to −60° C.

System 11 may comprise an outer box 13. Outer box 13, which may be, for example, a conventional corrugated cardboard box or carton, may comprise a rectangular prismatic cavity 15 bounded by a plurality of rectangular side walls 17-1 through 17-4, a plurality of bottom closure flaps (only one of which is shown), and a plurality of top closure flaps 19-1 through 19-4. Adhesive strips of tape or other closure means (not shown) may be used to retain, in a closed condition, the bottom closure flaps and top closure flaps 19-1 through 19-4. In one exemplary embodiment, outer box 13 may have outer dimensions of approximately 15¾ in.×15¾ in.×20⅛ in. and an outer volume of approximately 81.8 L.

Although not shown, one or more of side walls 17-1 through 17-4 may be equipped with one or more handles, which may be used to facilitate the carrying or other movement of shipping system 11. Such handles may be integrally formed in one or more of side walls 17-1 through 17-4 or may be extraneous structures attached to one or more of side walls 17-1 through 17-4.

Figure 3A:
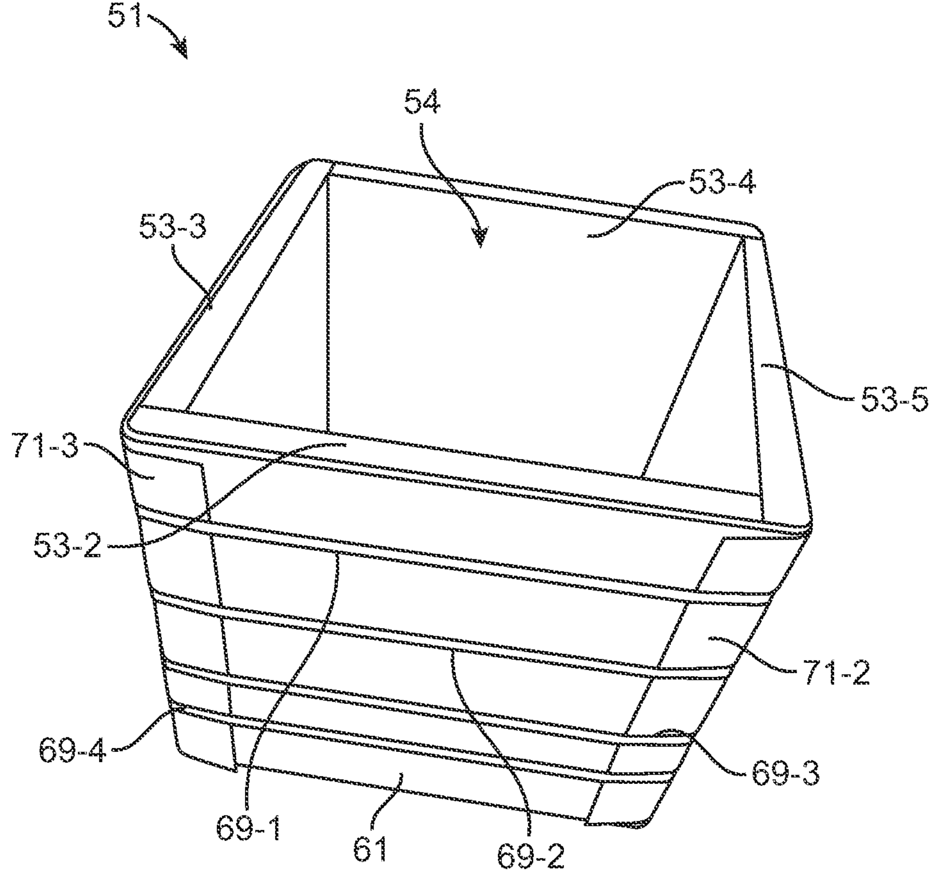
FIG. 3A are 3B perspective and partly exploded perspective views, respectively, of the insulated base shown in FIG. 2.
Figure 3B:
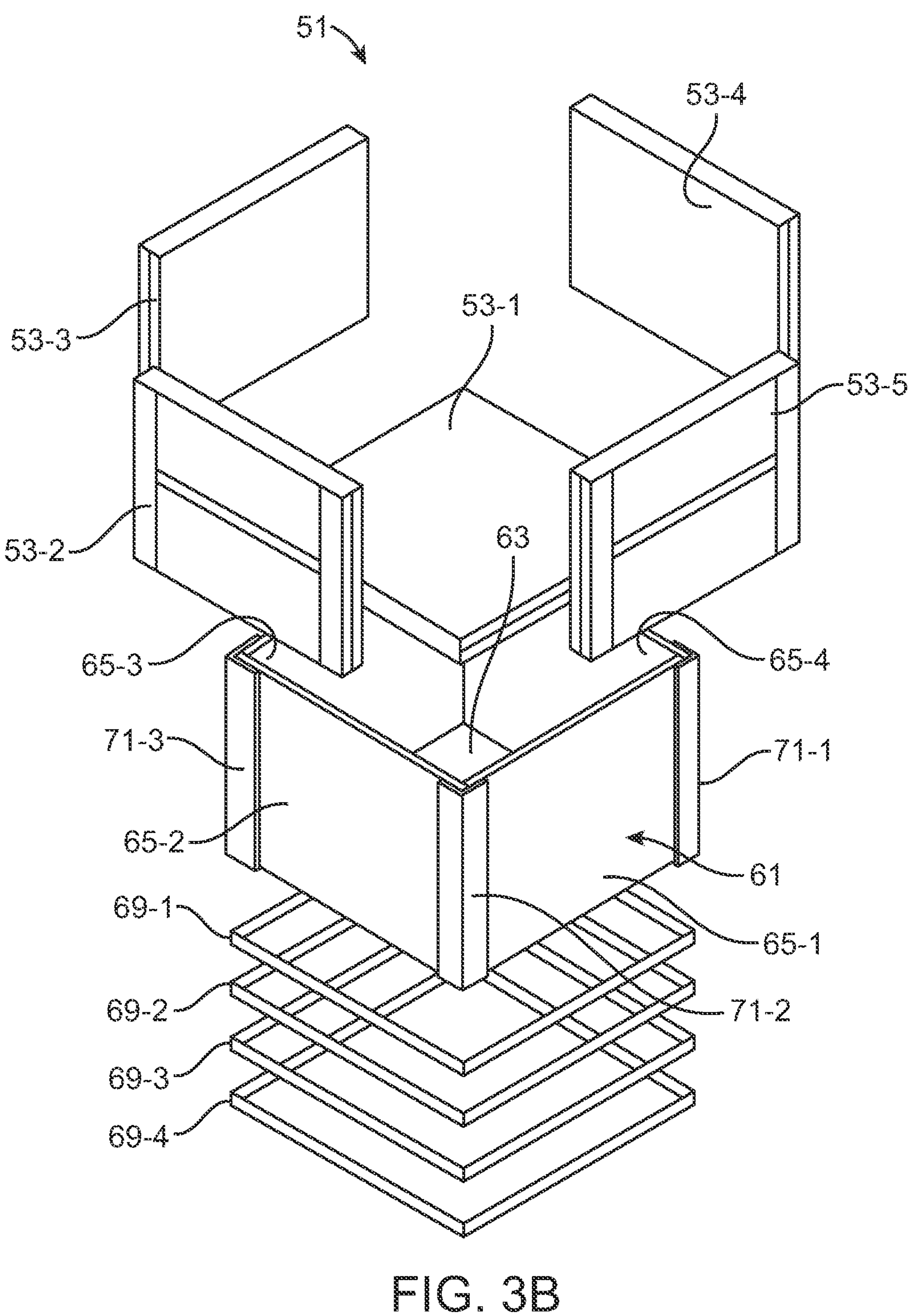

System 11 may further comprise an insulated base 51. Insulated base 51, which is also shown separately in FIGS. 3A and 3B, may be similar or identical to insulation unit 51 of U.S. Patent Application Publication No. US 2019/0210790 A1, inventors Rizzo et al., published Jul. 11, 2019, and incorporated herein by reference. Accordingly, insulated base 51 may comprise a plurality of vacuum insulated panels 53-1 through 53-5, which may be similar or identical to one another. (Panels 53-2 through 53-5 may be identical to one another in size whereas panel 53-1 may be dimensioned slightly differently.) Vacuum insulated panels 53-1 through 53-5, which may be conventional vacuum insulated panels, may be arranged so that vacuum insulated panels 53-2 through 53-5 are positioned perpendicularly relative to and sitting directly on top of vacuum insulated panel 53-1 to define a generally prismatic cavity 54 bounded by a bottom wall and four side walls. The four side walls may be positioned relative to one another in a "pinwheel"-type arrangement, wherein one end of each vacuum insulated panel abuts the inside major surface of its adjacent vacuum insulated panel. Alternatively, the four side walls may be positioned relative to one another so that one end of each of two parallel vacuum insulated panels abuts the inside major surface of each of the two remaining parallel vacuum insulated panels. Each of vacuum insulated panels 53-1 through 53-5 may include or may be partially or completely covered by a metal foil.

Insulated base 51 may additionally comprise a support 61. Support 61, which may be made of corrugated cardboard or the like, may be a unitary box-like structure configured to include a central portion 63 and four side portions 65-1 through 65-4. Central portion 63 may be rectangular, and each of four side portions 65-1 through 65-4 may extend from a different one of the four sides of the central portion 63. Support 61 may be folded along the four peripheral edges of central portion 63 and may be appropriately dimensioned so that the central portion 63 of support 61 may be positioned under vacuum insulated panel 53-1 and so that side portions 65-1 through 65-4 of support 61 may be positioned along the outside faces of vacuum insulated panels 53-2 through 53-5, as well as along the peripheral edges of vacuum insulated panel 53-1. Support 61 may be used, in conjunction with other structural members, to help keep vacuum insulation panels 53-1 through 53-5 assembled together. In addition, support 61 may also provide some additional thermal insulation to insulated base 51.

Insulated base 51 may further comprise a plurality of plastic binding straps 69-1 through 69-4. Straps 69-1 through 69-4, which may be conventional binding straps, may be wrapped around the four sides of support 61 and may be used to help retain vacuum insulated panels 53-1 through 53-5 in an assembled state.

Insulated base 51 may further comprise a plurality of corner boards 71-1 through 71-4. Corner boards 71-1 through 71-4 may be similar or identical to one another. Corner boards 71-1 through 71-4 may be made of Kraft paper, and each may have a thickness, for example, of 0.06 to 0.08 inch. Corner boards 71-1 through 71-4 may be positioned vertically at the four exterior corners of support 61 and may help to increase the thermal life of insulated base 51 by keeping panels 53-1 through 53-5 together and tighter for a longer period of time and by protecting support 61 and panels 53-1 through 53-5 from physical damage that may be caused by straps 69-1 through 69-4, particularly at the four corners of insulated base 51. Corner boards 71-1 through 71-4 also may help to increase the length of time that straps 69-1 through 69-4 are able to hold a minimal required tension in a reuse application.

Insulated base 51 may be assembled as follows: First, support 61 may be folded and then placed in a fixture (not shown), whereby side portions 65-1 through 65-4 may be maintained in a generally perpendicular orientation relative to central portion 63. Next, panel 53-1 may be positioned with its bottom major surface flush on top of central portion 63. Next, panels 53-2 through 53-5 may be positioned on top of panel 53-1 in a "pinwheel" arrangement. (Preferably, the seams of panels 53-1 through 53-5 face outwardly towards support 61.) Next, corner boards 71-1 through 71-4 may be placed around the exterior four corners of the support 61. Next, straps 69-1 through 69-4 may be wrapped around support 61 and corner boards 71-1 through 71-4. (Preferably, each of straps 69-1 through 69-4 provides a tension of at least 10 psi.) The resulting structure is a five-sided unit defining a cavity 54 bounded by a bottom and having four equal sides and an open top. As can be appreciated, in the absence of the combination of support 61, straps 69-1 through 69-4, and corner boards 71-1 through 71-4, there is nothing keeping panels 53-1 through 53-5 in an assembled state.

It is to be understood that, although, in the present embodiment, insulated base 51 may comprise a plurality of vacuum insulated panels, insulated base 51 need not comprise vacuum insulated panels. For example, insulated base 51 may comprise, or may consist of, one or more pieces of polyurethane foam insulation, expanded polystyrene insulation, or one or more other types of insulation. Also, it is to be understood that, although, in the present embodiment, insulated base 51 may be dimensioned so that cavity 54 is substantially square in horizontal (i.e., lateral) cross-section, insulated base 51 need not be so dimensioned. Accordingly, for example, cavity 54 may have a horizontal cross-section with unequal adjacent sides (i.e., rectangular but not square) or may have a horizontal cross-section that does not include right angles (i.e., parallelogram but not rectangular) or may have a horizontal cross-section that is not four-sided.

Figure 4:
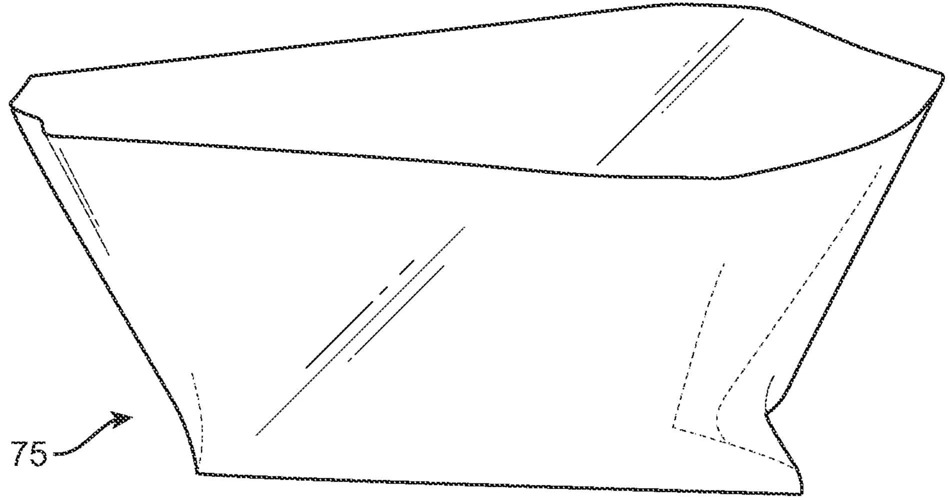
FIG. 4 is a perspective view of the baffle shown in FIG. 2.

Shipping system 11 may further comprise a baffle 75, which is also shown separately in FIG. 4. Baffle 75 may be similar or identical in structure and function to the gas flow director of U.S. Patent Application No. 63/151,146, inventors Heather M. Conway et al., filed Feb. 19, 2021, and U.S. patent application Ser. No. 17/675,251, inventors Heather M. Conway et al., filed Feb. 18, 2022, both of which are incorporated herein by reference. In the present embodiment, baffle 75 may be in the form of a flexible polymer bag having an open top end. Insulated base 51 may be received within baffle 75, with the open top ends of insulated base 51 and baffle 75 facing in substantially the same direction and with the open top end of baffle 75 terminating at around the same height as (or slightly above or slightly below) the open top end of insulated base 51. Preferably, baffle 75 and insulated base 51 are dimensioned so that the combination thereof may be snugly, yet removably, received within cavity 15 of outer box 13. Notwithstanding the above, if desired, some clearance may be provided between baffle 75 and outer box 13 to facilitate the insertion and removal of baffle 75 and insulated base 51 into and from box 13. Moreover, if desired, baffle 75 may be omitted.

Figure 5:
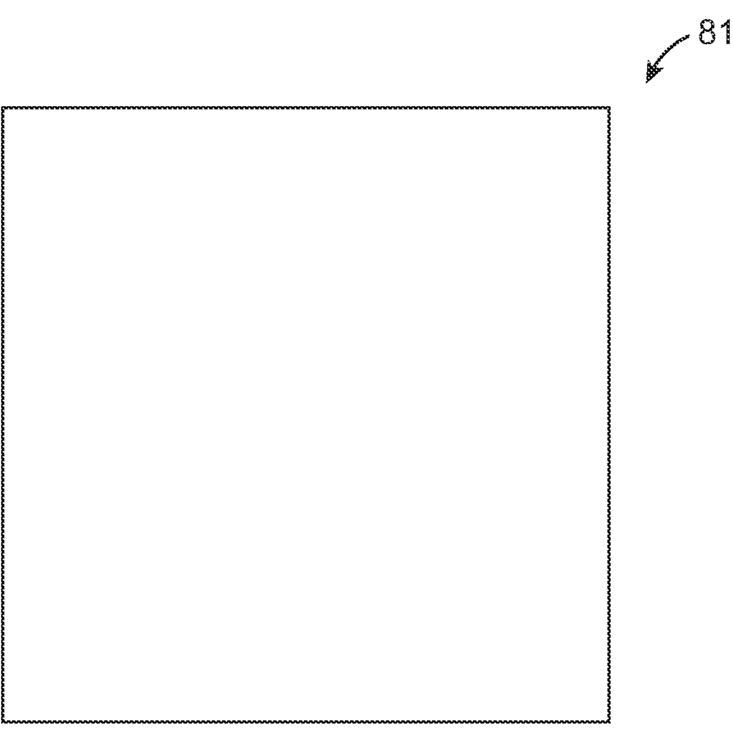
FIG. 5 is a top view of the bottom pad shown in FIG. 2.

Shipping system 11 may further comprise a bottom pad 81, which is also shown separately in FIG. 5. Bottom pad 81 may be a unitary (i.e., one-piece) or multi-piece substantially planar structure and may comprise, for example, a piece of foam insulation (e.g., polyethylene foam) or the like. Bottom pad 81 may be snugly, yet removably, positioned within cavity 54 of insulated base 51 directly on top of panel 53-1. Bottom pad 81 may have one or more recesses or cutouts (not shown) for use in receiving a temperature probe (not shown). Bottom pad 81 may also be used to help seal insulated base 51 in the areas where panels 53-2 through 53-5 meet panel 53-1. Notwithstanding the above, if desired, bottom pad 81 may be omitted.

Shipping system 11 may further comprise a product box 99, in which the temperature-sensitive materials (not shown) may be disposed. Product box 99, which may be a conventional corrugated cardboard box, may be shaped to define a generally rectangular prismatic cavity dimensioned to hold a payload. In one exemplary embodiment, product box 99 may define payload dimensions of approximately 9¼ in.×9¼ in.×8⅜ in. and a payload volume of approximately 11.6 L.

Shipping system 11 may further comprise a conductive equalizer 101. Conductive equalizer 101 may be similar in structure and function to the conductive equalizer disclosed in U.S. Pat. Nos. 10,309,709 B2 and 9,689,602 B2, both of which are incorporated herein by reference. In the present embodiment, conductive equalizer 101 may be in the form of a bag consisting of or comprising a thermally conductive material (e.g., aluminum). An example of conductive equalizer 101 may comprise a TTx Thermal Solution bag, which is commercially available from The Illuminate Group (Tampa, Fla.). Preferably, conductive equalizer 101 is dimensioned so that product box 99 may be inserted thereinto, with the open end of conductive equalizer 101 being folded around product box 99 and optionally sealed shut so that conductive equalizer 101 may snugly or loosely, yet removably, contain product box 99. Notwithstanding the above, if desired, conductive equalizer 101 may be omitted.

Figure 6:
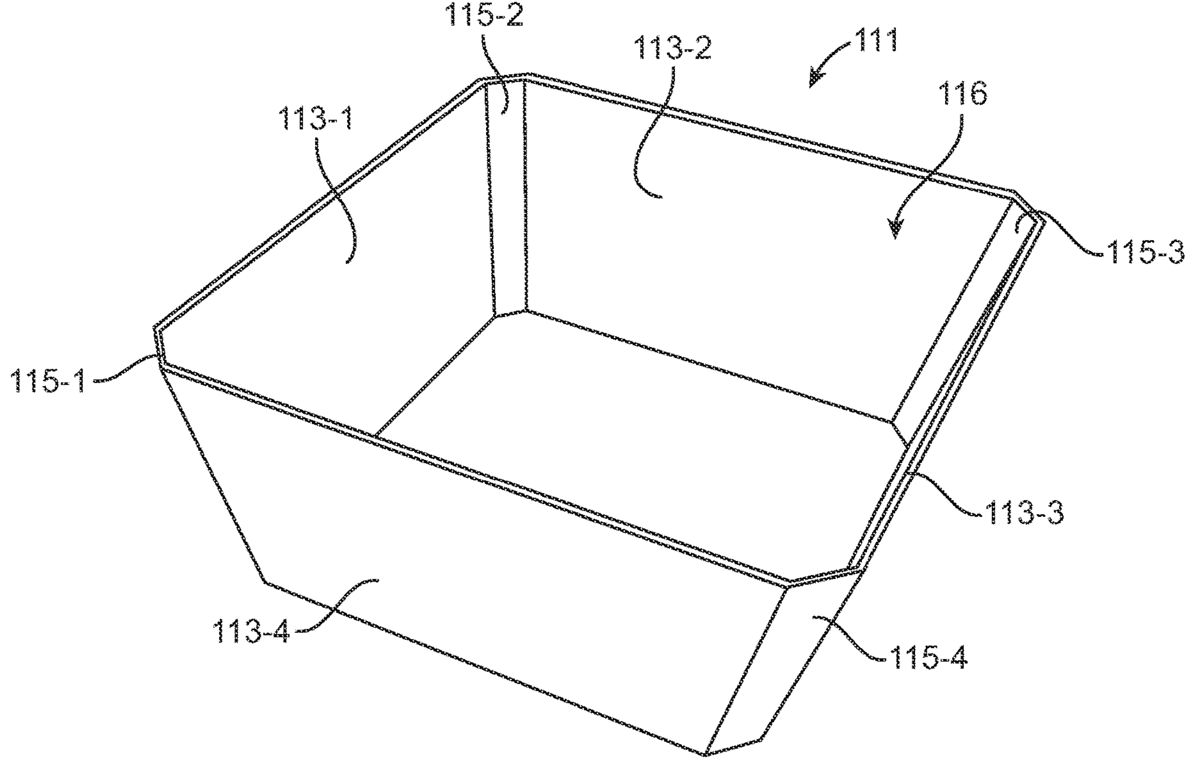
FIG. 6 is a perspective view of the sleeve shown in FIG. 2.
Figure 7:
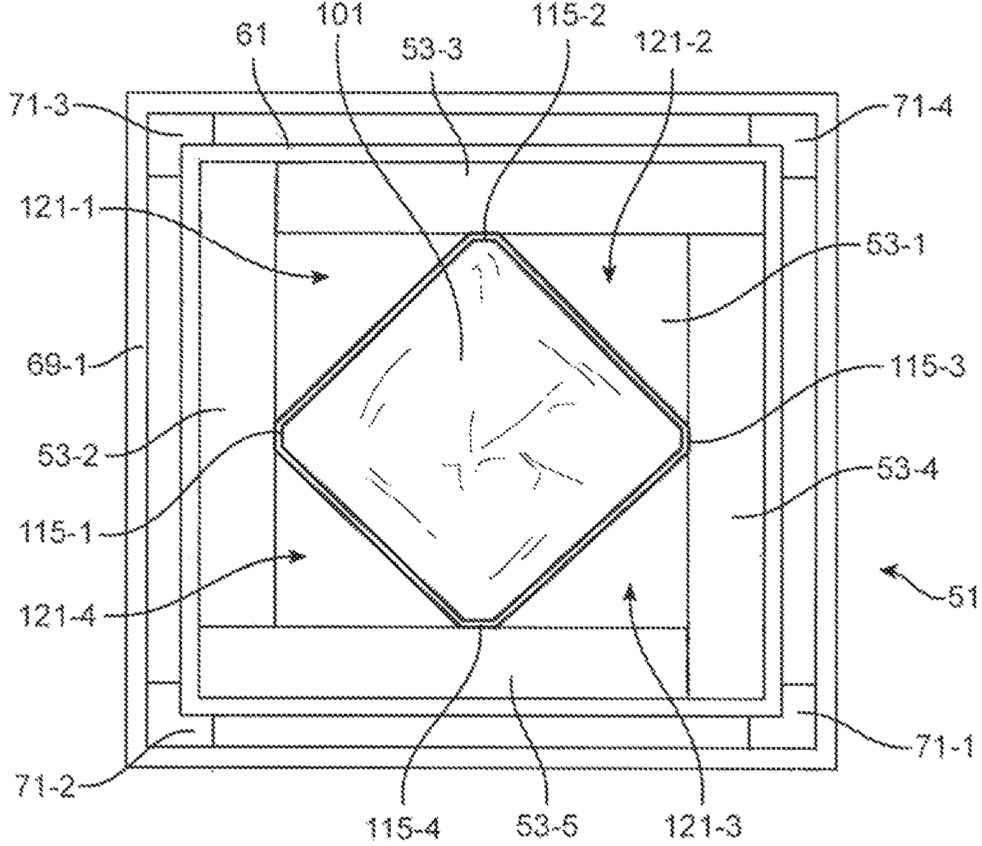
FIG. 7 is a top view showing the combination of the insulated base, the sleeve, and the conductive equalizer shown in FIG. 2.

Shipping system 11 may further comprise a divider or sleeve 111, which is also shown separately in FIG. 6. Sleeve 111 may be a unitary (i.e., one-piece) or multi-piece structure and may be shaped to include a plurality of side walls 113-1 through 113-4 having beveled corners 115-1 through 115-4, an open top, and an open bottom. Side walls 113-1 through 113-4 and beveled corners 115-1 through 115-4 may collectively define a cavity 116. (In another embodiment (not shown), sleeve 111 may have a closed or closeable bottom and/or a closed or closeable top.) In the present embodiment, sleeve 111 may comprise a molded polymeric structure, preferably made of a material capable of withstanding dry ice temperatures (e.g., high density polyethylene (HDPE)); however, it is to be understood that sleeve 111 need not be a molded polymeric structure and may be made from other types of materials, such as cardboard or the like.

Where sleeve 111 comprises a molded polymeric material, sleeve 111 may have a small draft angle, i.e., taper outwardly from bottom to top.

Sleeve 111 may be appropriately dimensioned so that product box 99 and conductive equalizer 101 may be removably received in cavity 116 and, at the same time, may also be appropriately dimensioned to minimize movement or other rotation of conductive equalizer 101 and product box 99 relative to sleeve 111. Preferably, cavity 116 is dimensioned so that there is a small amount of clearance between one or more side walls of conductive equalizer 101 and sleeve 111 to facilitate the insertion and removal of conductive equalizer 101 and product box 99 into and from sleeve 111. (Where conductive equalizer 101 is omitted from shipping system 11, there is preferably a small amount of clearance between one or more side walls of product box 99 and sleeve 111 to facilitate the insertion and removal of product box 99 into and from sleeve 111.)

In the present embodiment, sleeve 111 is preferably shaped to be generally square in horizontal cross-section (albeit with beveled corners) and is preferably dimensioned so that it may be positioned, for example, removably positioned, within insulated base 51, preferably on top of bottom pad 81, such that corners 115-1 through 115-4 may contact the inner facing surfaces of vacuum insulated panels 53-2 through 53-5, respectively. In so doing, sleeve 111 may be used to divide the space defined by insulated base 51 (or, where bottom pad 81 is present, the space defined by the combination of insulated base and bottom pad 81) into four discrete cavities 121-1 through 121-4 of generally equal volume surrounding cavity 116, which is centrally located. In the present embodiment, cavities 121-1 through 121-4 may be generally triangular in horizontal cross-section and may have at least two equal sides (e.g., the sides along base 51). As will be discussed further below, each of cavities 121-1 through 121-4 may receive a quantity of a phase-change or temperature-regulating material, such as pelletized dry ice.

As can be appreciated, in the present embodiment, sleeve 111 may be oriented along its longitudinal axis (extending between its open top end and its open bottom end) at approximately a 45 degree offset angle relative to the longitudinal axis of insulated base 51 (extending between its open top end and its bottom end). Because, in the present embodiment, both sleeve 111 and insulated base 51 are generally square in horizontal cross-section, the aforementioned offset orientation of sleeve 111 relative to insulated base 51 results in corners 115-1 through 115-4 substantially bisecting vacuum insulated panels 53-2 through 53-5, respectively, and in cavities 121-1 through 121-4 being generally triangular in horizontal cross-section. It is believed that such a shape of cavities 121-1 through 121-4 may be particularly advantageous in maximizing the cooling effect of pelletized dry ice or other cooling agent positioned within cavities 121-1 through 121-4. In addition, the triangular shape of cavities 121-1 through 121-4 also may facilitate the automated loading of pelletized dry ice thereinto as it affords a wider space to receive the pelletized dry ice than would be the case if sleeve 111 and insulated base 51 were rotationally aligned (i.e., not offset rotationally). However, notwithstanding the above, the present invention is not to be limited to the present embodiment. Accordingly, for example, one or both of sleeve 111 and insulated base 51 may be shaped to have a horizontal cross-section that is not square; in such a case, sleeve 111 and insulated base 51 may be dimensioned, and sleeve 111 may be offset relative to insulated base 51, such that some or all of the corners of sleeve 111 may contact a corresponding side of insulated base 51. Moreover, in the foregoing case or otherwise, sleeve 111 and insulated base 51 may be dimensioned so that sleeve 111 contacts insulated base 51 at points other than along the respective midlines of panels 53-2 through 53-5 (i.e., panels 53-2 through 53-5 are not bifurcated by sleeve 111).

Figure 8A:
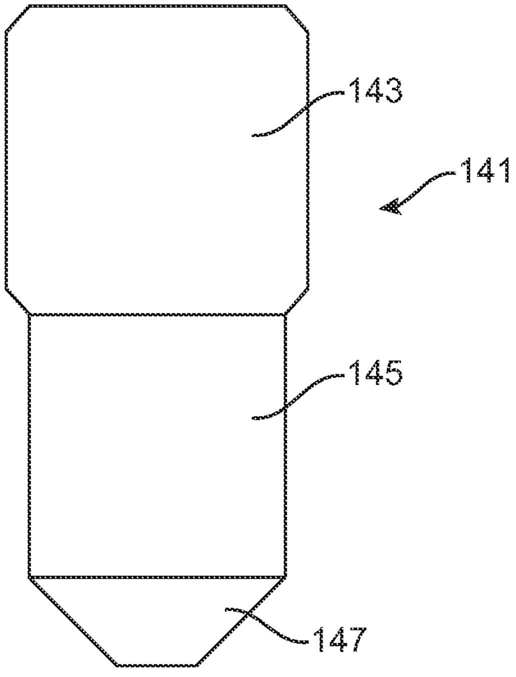
FIG. 8A is a top view of the guide shown in FIG. 2, the guide in FIG. 8A being shown prior to being folded for use.
Figure 8B:
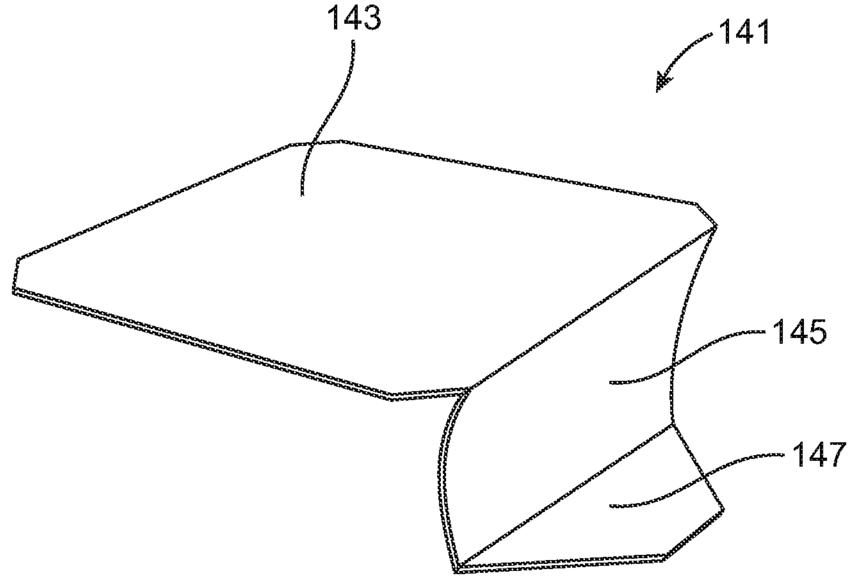
FIG. 8B is a perspective view of the guide shown in FIG. 2, the guide being shown in a folded state.
Figure 9:
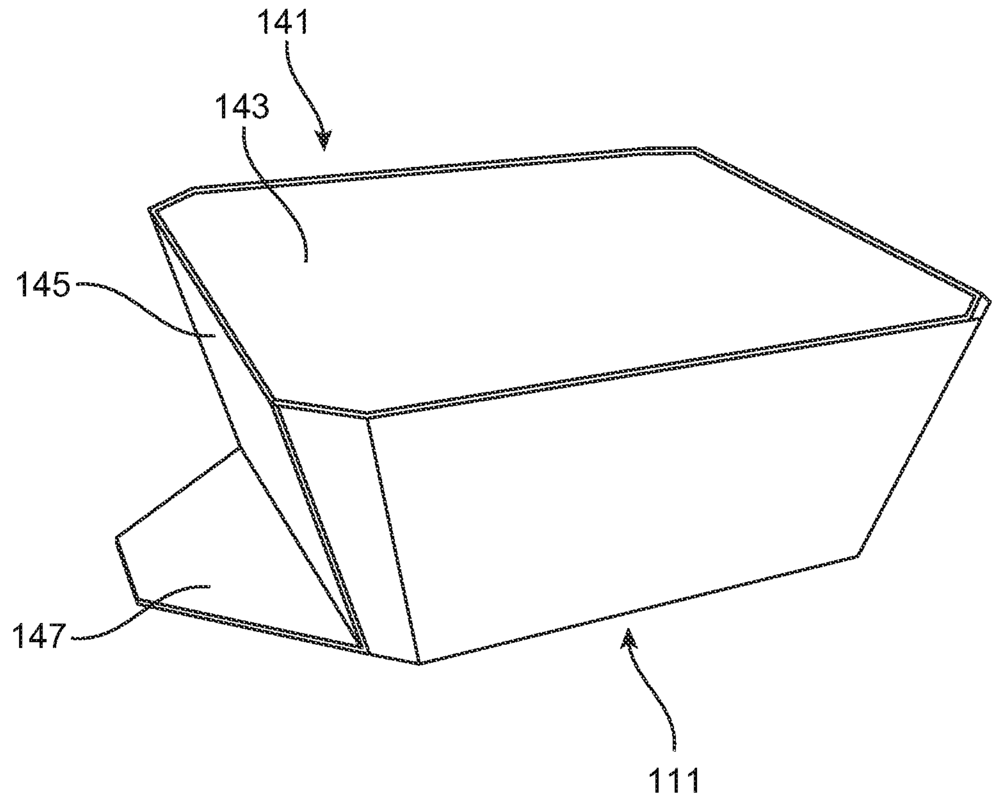
FIG. 9 is a perspective view showing the combination of the sleeve and the guide shown in FIG. 2.
Figure 10:
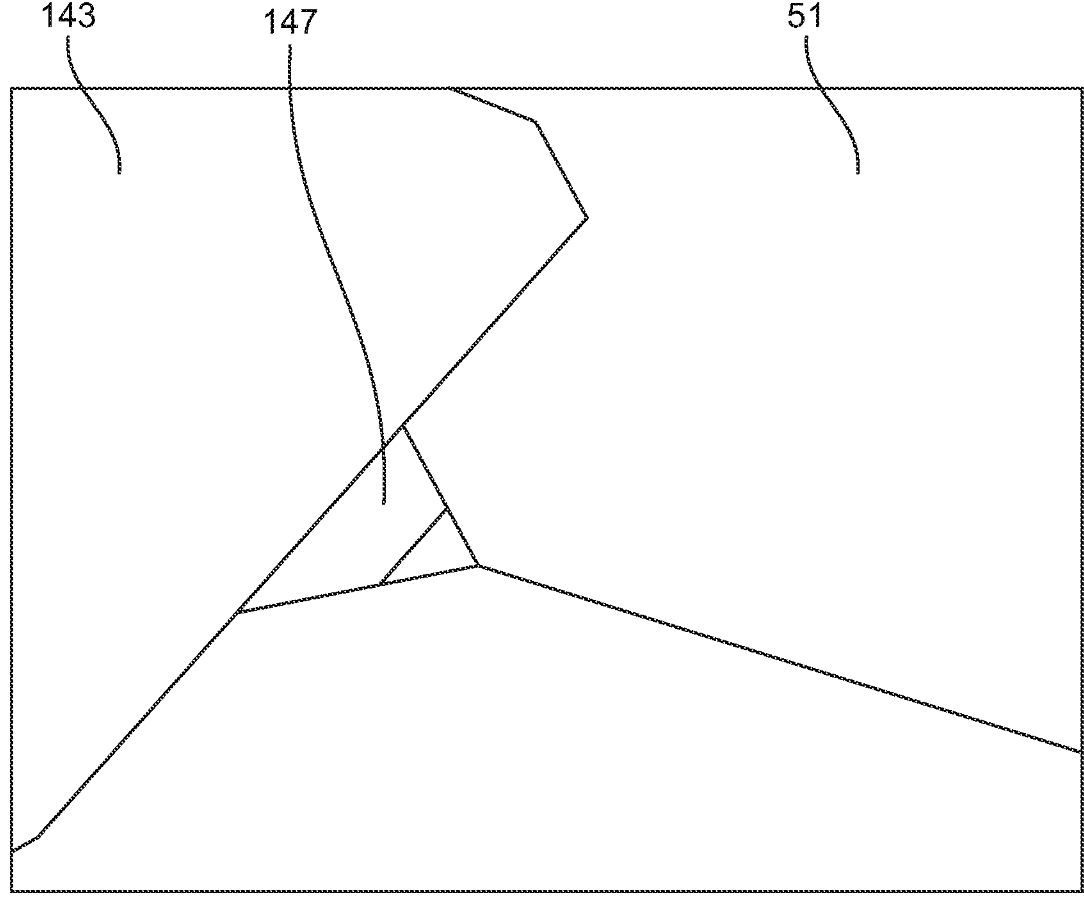
FIG. 10 is a perspective view showing the combination of the insulated base and the guide shown in FIG. 2.

Shipping system 11 may further comprise a guide 141, which is also shown separately in FIGS. 8A and 8B. Guide 141 may be a unitary (i.e., one-piece) or multi-piece structure and may be shaped to include a top panel 143, a side panel 145, and a bottom panel 147. In the present embodiment, guide 141 may be made of corrugated cardboard or, alternatively, may be made from one or more other types of materials, such materials preferably being capable of withstanding dry ice temperatures. Preferably, guide 141 is dimensioned so that top panel 143 has a footprint that substantially matches that of the top end of sleeve 111 (see FIG. 9)). Accordingly, top panel 143 may have a generally square shape with four beveled corners. Consequently, top panel 143 may engage the vertical side walls of insulated base 51 in a manner similar to the manner in which sleeve 111 does. Guide 141 may also be dimensioned so that bottom panel 147 may engage insulated base 51 at or near a lower inside corner thereof (see FIG. 10). For example, bottom panel 147 may have a shape that mates with insulated base 51 at or near a corner thereof, examples of such a shape including a triangular shape or a beveled triangular shape. Consequently, by placing top panel 143 of guide 141 on top of sleeve 111 and by placing bottom panel 147 on top of bottom pad 81 (or on top of vacuum insulated panel 53-1 in the event that bottom pad 81 is omitted) and into engagement with insulated base 51 (with side panel 145 extending generally vertically between top panel 143 and bottom panel 147), guide 141 may serve to keep sleeve 111, and the contents thereof, from rotating relative to insulated base 51. (The engagement of sleeve 111 with insulated base 51 also helps to keep sleeve 111 from rotating relative to base 51, albeit to a lesser extent.) The prevention of rotation afforded by guide 141 may be advantageous since rotation of sleeve 111 relative to insulated base 51 may cause cavities 121-1 through 121-4 to change in size and/or shape, which may result in an undesirable thermal effect.

In the present embodiment, guide 141 is not fastened to sleeve 111; however, it is to be understood that guide 141 may be fastened to sleeve 111 by any one or more suitable types of fasteners (e.g., mechanical fasteners, adhesives, etc.).

In an exemplary embodiment, guide 141 may be dimensioned as follows: Top panel 143 may have a length of 9⅞ inch and a width of 9⅞ inch, with corner bevels spaced 13/16 inch from each side. Side panel 145 may have a length of 8 5/16 inch and a length of 8¼ inch. Bottom panel 147 may have a length of 3 inch and may taper from opposite sides of side panel 145 at a 45 degree angle.

Figure 11:
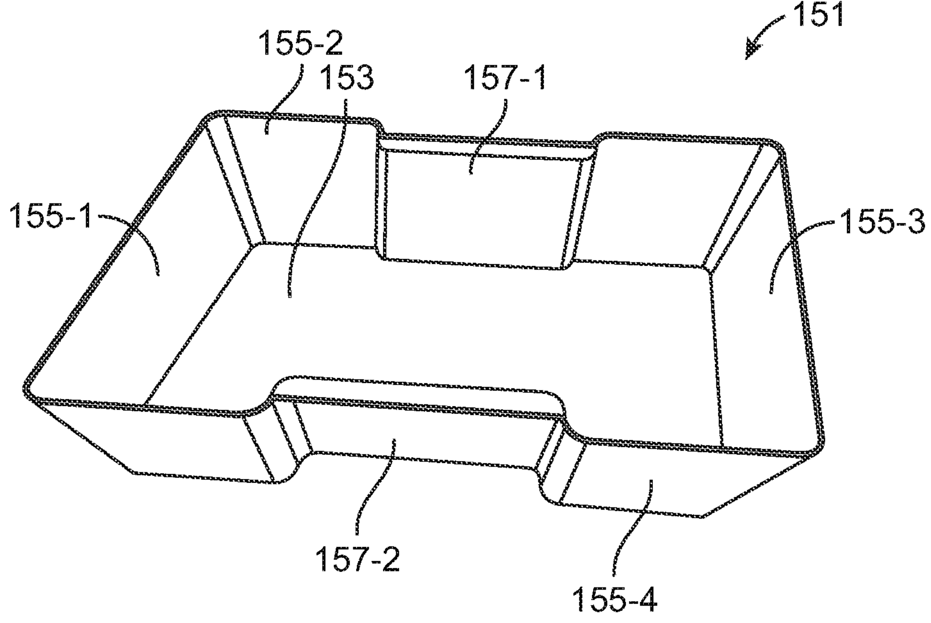
FIG. 11 is a perspective view of the tray shown in FIG. 2.

Shipping system 11 may further comprise a tray 151, which is also shown separately in FIG. 11. Tray 151 may be a unitary (i.e., one-piece) or multi-piece structure and may be shaped to include a bottom 153 (which may be flat), a plurality of sides 155-1 through 155-4, and an open top. In the present embodiment, tray 151 may be made of one or more molded polymers or, alternatively, may be made from one or more other types of materials. Preferably, tray 151 is made of a material capable of withstanding dry ice temperatures (e.g., HDPE, corrugated cardboard, etc.). Tray 151 may sit within insulated base 51 directly on top of guide 141. Preferably, tray 151 is dimensioned so that its footprint substantially matches that of the interior of insulated base 51, except for a pair of recessed areas 157-1 and 157-2 in tray 151 that may serve as handles. In addition, tray 151 is preferably dimensioned so that its top edge lies substantially flush with, or just below, the top edge of insulated base 51. As will be described further below, tray 151 may be used to hold a quantity of pelletized dry ice or another temperature-regulating or phase-change material. Notwithstanding the above, if desired, tray 151 may be omitted.

Shipping system 11 may further comprise an insulated cover 161. In the present embodiment, insulated cover 161 may be a vacuum insulated panel that is similar in construction and dimensions to vacuum insulated panel 53-1; however, it is to be understood that insulated cover 161 need not be a vacuum insulated panel and, instead, may be made of one or more alternative types of insulation (e.g., foam insulation, etc.). Insulated cover 161 preferably has a footprint that substantially matches that of insulated base 51 such that, when shipping system 11 is in a fully assembled and closed state, insulated cover 161 may be positioned over and may align with insulated base 51, thereby closing cavity 54 of insulated base 51.

Shipping system 11 may further comprise a gasket 171. Gasket 171 may be a unitary (i.e., one-piece) or multi-piece structure made of rubber or another suitable material. Gasket 171 may be secured, for example, using an adhesive (not shown), to the bottom surface of insulated cover 161 proximate to its perimeter so that, when shipping system 11 is in a fully assembled and closed state, gasket 171 may be disposed between insulated base 51 and insulated cover 161 and may also frictionally engage outer box 13 to create a seal such that gasket 171 may serve to minimize fluid communication between the interior and the exterior of shipping system 11. Notwithstanding the above, if desired, gasket 171 may be omitted.

Shipping system 11 may further comprise a top pad 181. Top pad 181 may be a unitary (i.e., one-piece) or multi-piece structure made of polyethylene foam or another suitable material. The top surface of insulated cover 161 may be secured to the bottom surface of top pad 181 by any suitable means, for example, using hook and loop fasteners (as in U.S. Patent Application Publication No. US 2018/0328644 A1, which is incorporated herein by reference). A first portion of the top surface of top pad 181 may be shaped to include one or more cutouts (e.g., for receiving a data logger or for receiving one or more of a user's fingers), and a second portion of the top surface of top pad 181 may be secured, for example, using a glue (not shown), to the bottom surface of top flap 19-4 of outer box 13. Notwithstanding the above, if desired, top pad 181 may be omitted.

Figure 12A:
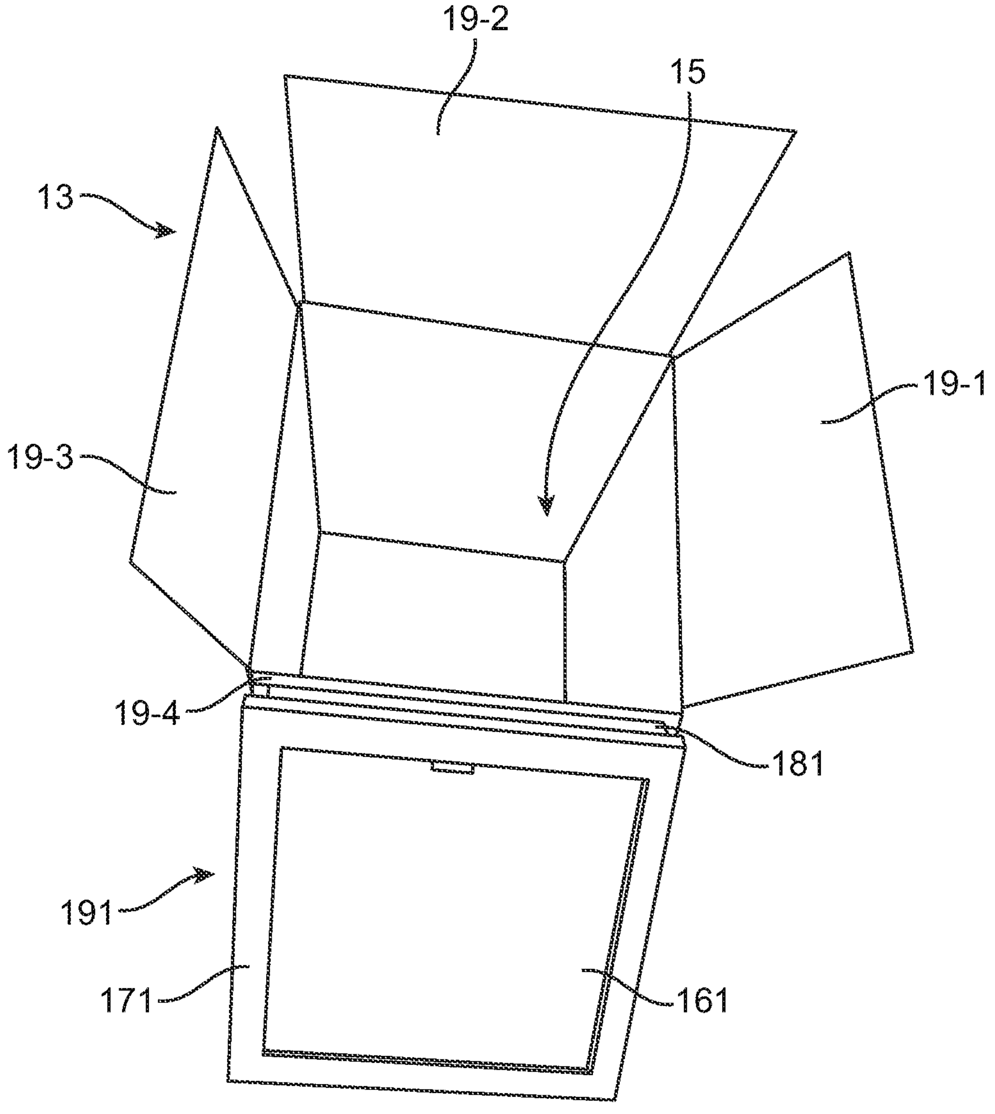
FIG. 12A is a perspective view showing the combination of the lid assembly and the outer box shown in FIG. 2, with all of the top flaps of the outer box pivoted outwardly.

Insulated cover 161, gasket 171, and top pad 181 may be collectively referred to as a lid assembly 191 (see FIG. 12A). If desired, lid assembly 191 may be omitted.

Figure 15:
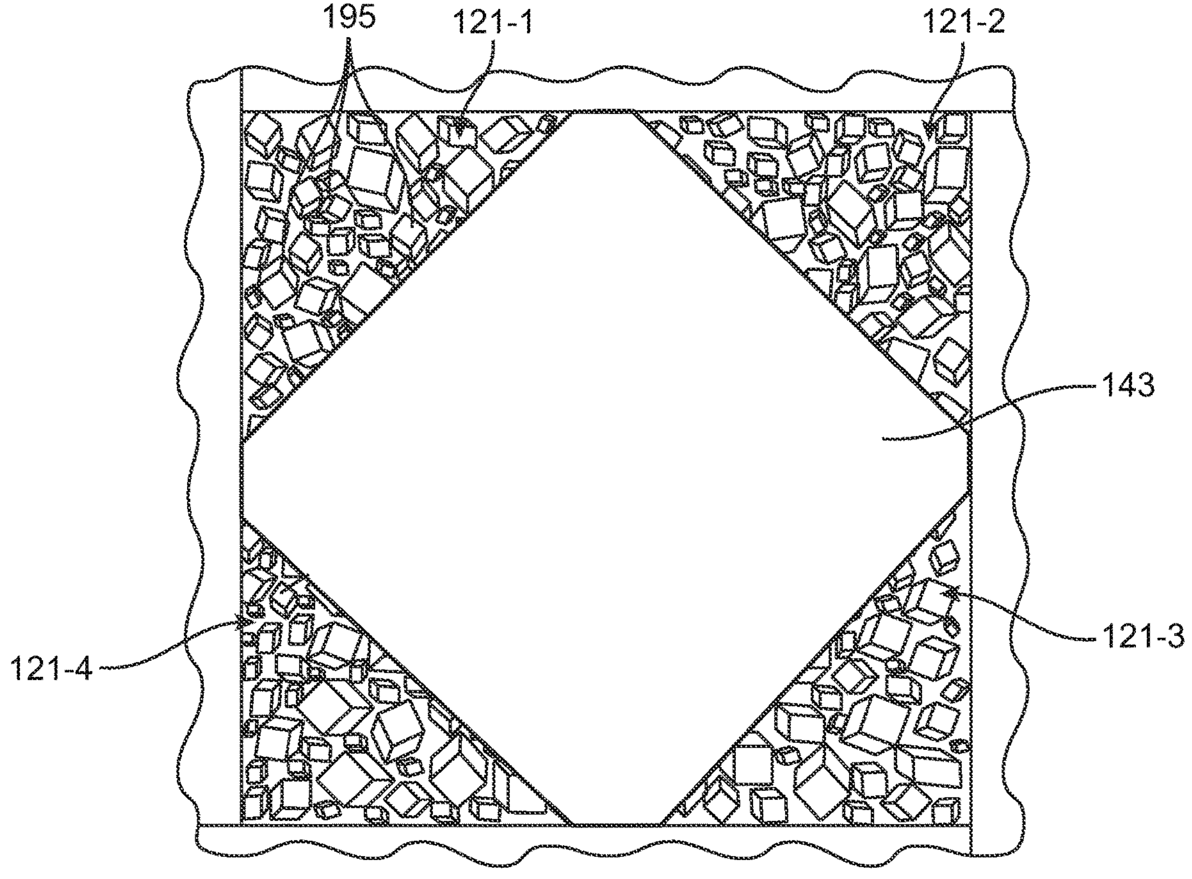
FIG. 15 is a fragmentary top view showing the assembly of FIG. 14 with pelletized dry ice added to the coolant cavities.
Figure 17:
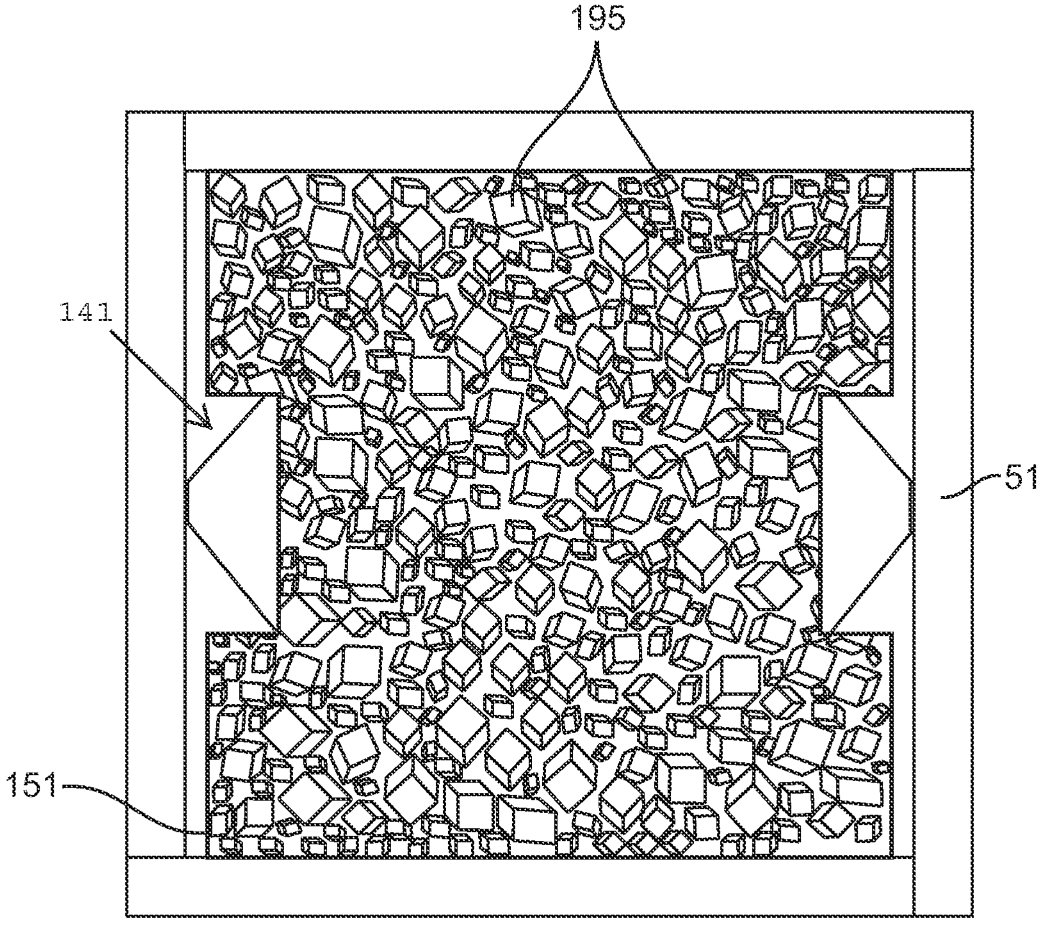
FIG. 17 is a top view of the assembly of FIG. 16 with pelletized dry ice added to the tray, the outer box and the lid assembly not being shown, portions of the insulated base not being shown, the pelletized dry ice in the coolant cavities not being shown.

As noted above, shipping system 11 may further comprise pelletized dry ice 195 (see FIGS. 15 and 17 below) or another suitable phase-change or temperature-regulating material. Where pelletized dry ice is used, a first quantity of pelletized dry ice (e.g., approximately 17 lbs.) may be distributed, preferably substantially equally, amongst cavities 121-1 through 121-4, and a second quantity of pelletized dry ice (e.g., approximately 27 lbs.) may be positioned within tray 151.

Figure 12B:
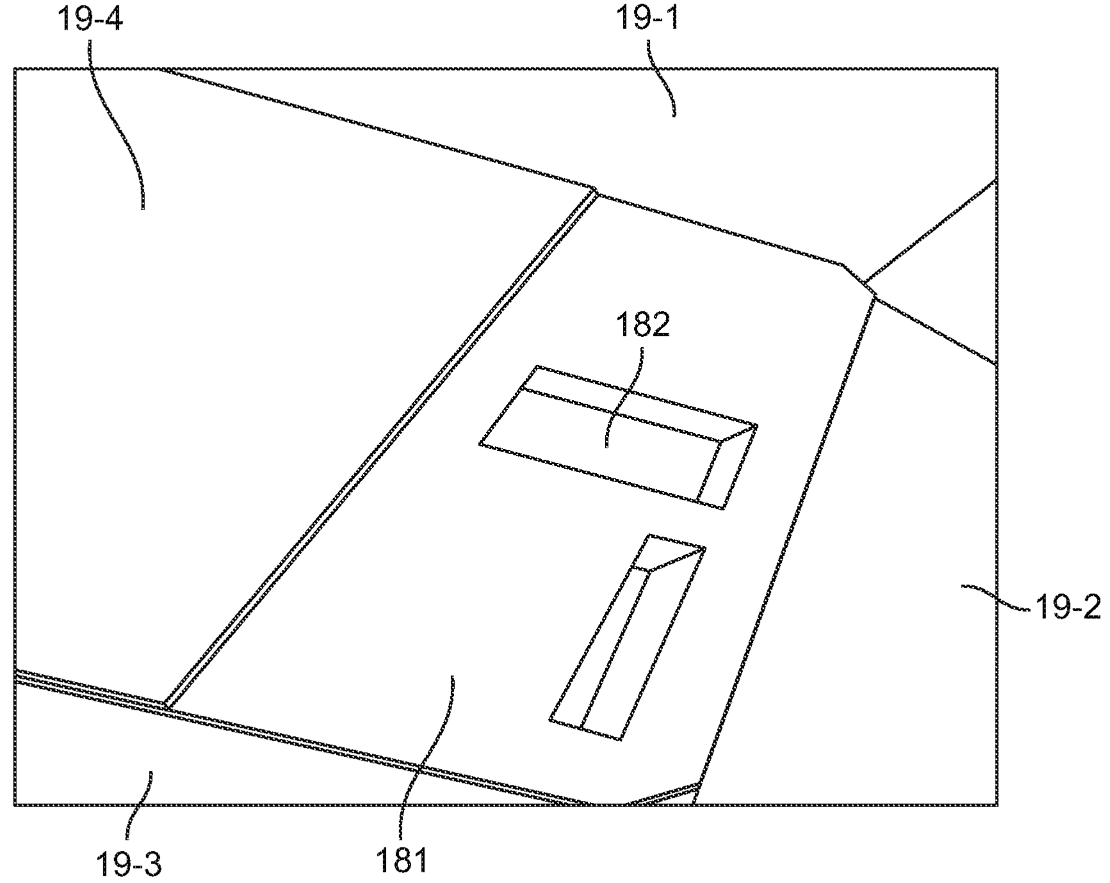
FIG. 12B is a perspective view showing the combination of the lid assembly and the outer box shown in FIG. 2, with the top flap connected to the lid assembly pivoted inwardly.
Figure 13:
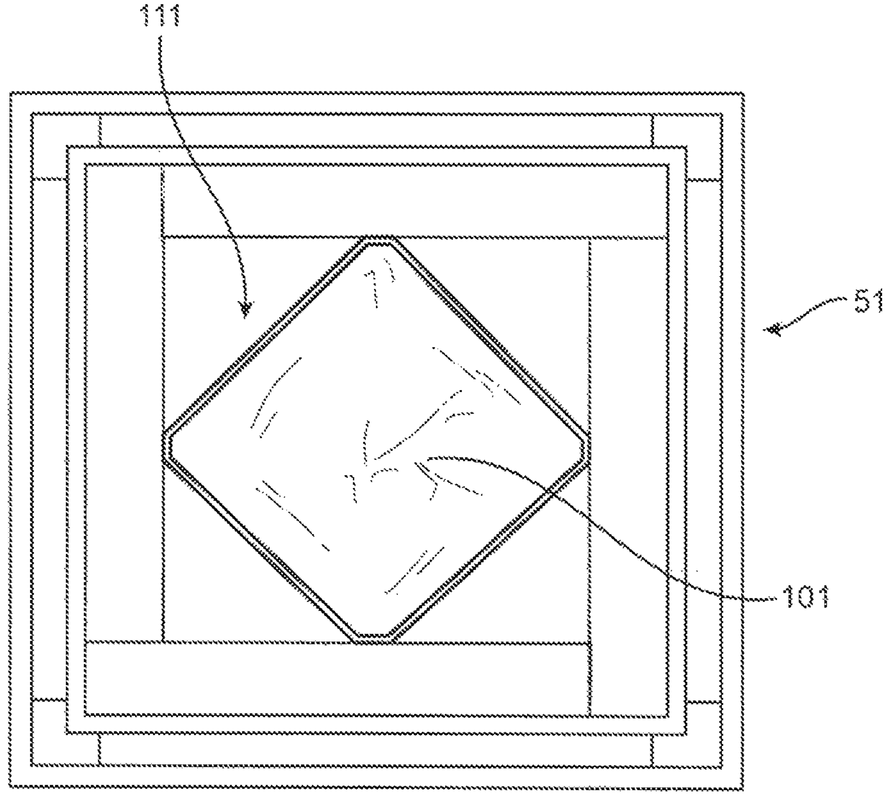
FIG. 13 is a top view showing the combination of the insulated base, the sleeve, and the conductive equalizer shown in FIG. 2.
Figure 14:
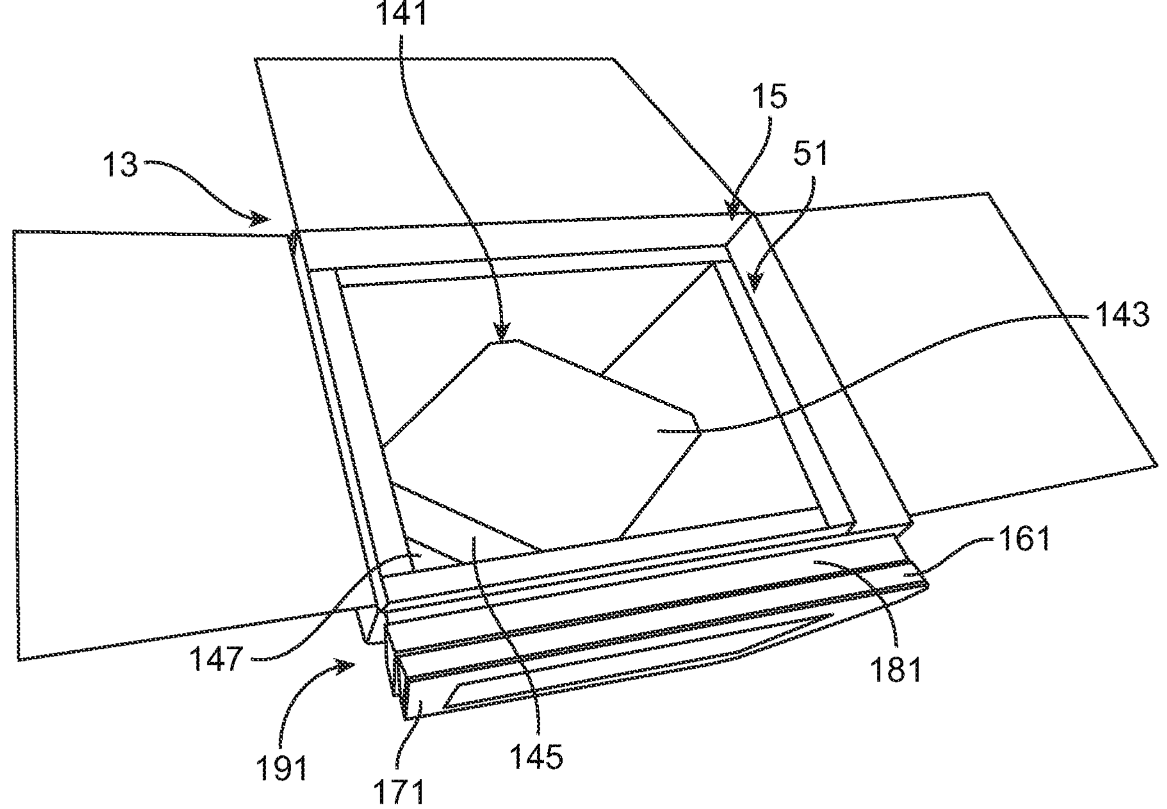
FIG. 14 is a perspective view showing the combination of the outer box, the insulated base, the sleeve, and the guide shown in FIG. 2.
Figure 16:
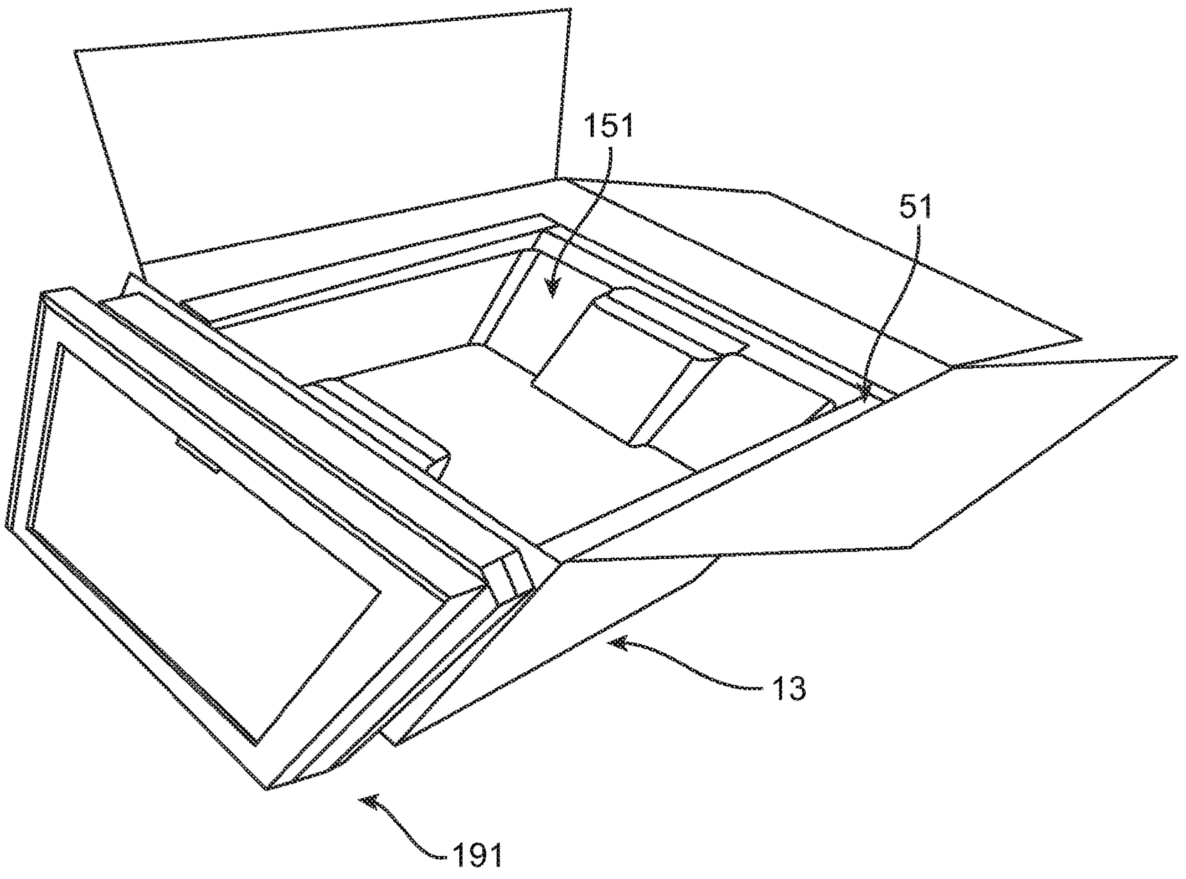
FIG. 16 is a perspective view of the assembly of FIG. 15 with the tray of FIG. 2 added.

One exemplary way in which shipping system 11 may be used is as follows: Lid assembly 191 (including a data logger (not shown) mounted in a cavity 182 of top pad 181) may be secured to top flap 19-4 of outer box 13 (see FIGS. 12A and 12B), insulated base 51 may be positioned within baffle 75, and the combination of insulated base 51 and baffle 75 may be positioned within cavity 15 of outer box 13. Next, bottom pad 81 (including a temperature probe (not shown) may be positioned within insulated base 51, and sleeve 111 may be positioned on bottom pad 81 within insulated base 51. Next, product box 99 (containing the payload) may be placed within conductive equalizer 101, conductive equalizer 101 may be sealed shut, for example, using tape or the like, and the combination of product box 99 and conductive equalizer 101 may be positioned with sleeve 111 (see FIG. 13, wherein bottom pad 81, outer box 13 and baffle 75 are not shown and product box 99 is not visible within conductive equalizer 101). Next, guide 141 may be positioned over sleeve 111 and mated with insulated base 51 (see FIG. 14). (Alternatively, guide 141 may be mounted on sleeve 111 prior to insertion of product box 99 and conductive equalizer 101 into sleeve 111, with top panel 143 of guide 141 being pivoted open to permit product box 99 and conductive equalizer 101 to be inserted into sleeve 111 and then pivoted shut.) Next, pelletized dry ice 195 may be placed in cavities 121-1 through 121-4 (see FIG. 15). This may be done by dispensing the pelletized dry ice onto top panel 143 of guide 141, whereby the pelletized dry ice may randomly bounce off top panel 143 into cavities 121-1 through 121-4 and/or an operator may guide the pelletized dry ice into cavities 121-1 through 121-4. Next, tray 151 may be positioned on top of top panel 143 within insulated base 51 (see FIG. 16), and an additional quantity of pelletized dry ice 195 may be dispensed into tray 151 (see FIG. 17). Top flap 19-4 may be closed so that lid assembly 191 is positioned over tray 151, and the remaining top flaps 19-3, 19-1 and 19-2 may be closed and sealed shut, for example, using tape or the like.

The various components of shipping system 11, except for the product load and the pelletized dry ice, may be preconditioned at a temperature of approximately +20° C.±5° C. The product load may be preconditioned at a temperature of approximately −70° C.±5° C., and the pelletized dry ice may be preconditioned at a temperature of −78° C.±5° C.

If desired, between uses, lid assembly 191 may be detached from outer box 13, inspected, and, if desired or needed, cleaned, refurbished and/or replaced. Similarly, if desired, between uses, insulated base 51 and/or baffle 75 may be removed from outer box 13, inspected, and, if desired or needed, cleaned, refurbished and/or replaced. Additionally, if desired, between uses, any one or more of the components disposed within insulated base, such as bottom pad 81, product box 99, conductive equalizer 101, sleeve 111, guide 141, and tray 151, may be removed from insulated base 51, inspected, and, if desired or needed, cleaned, refurbished and/or replaced.

Figure 18:
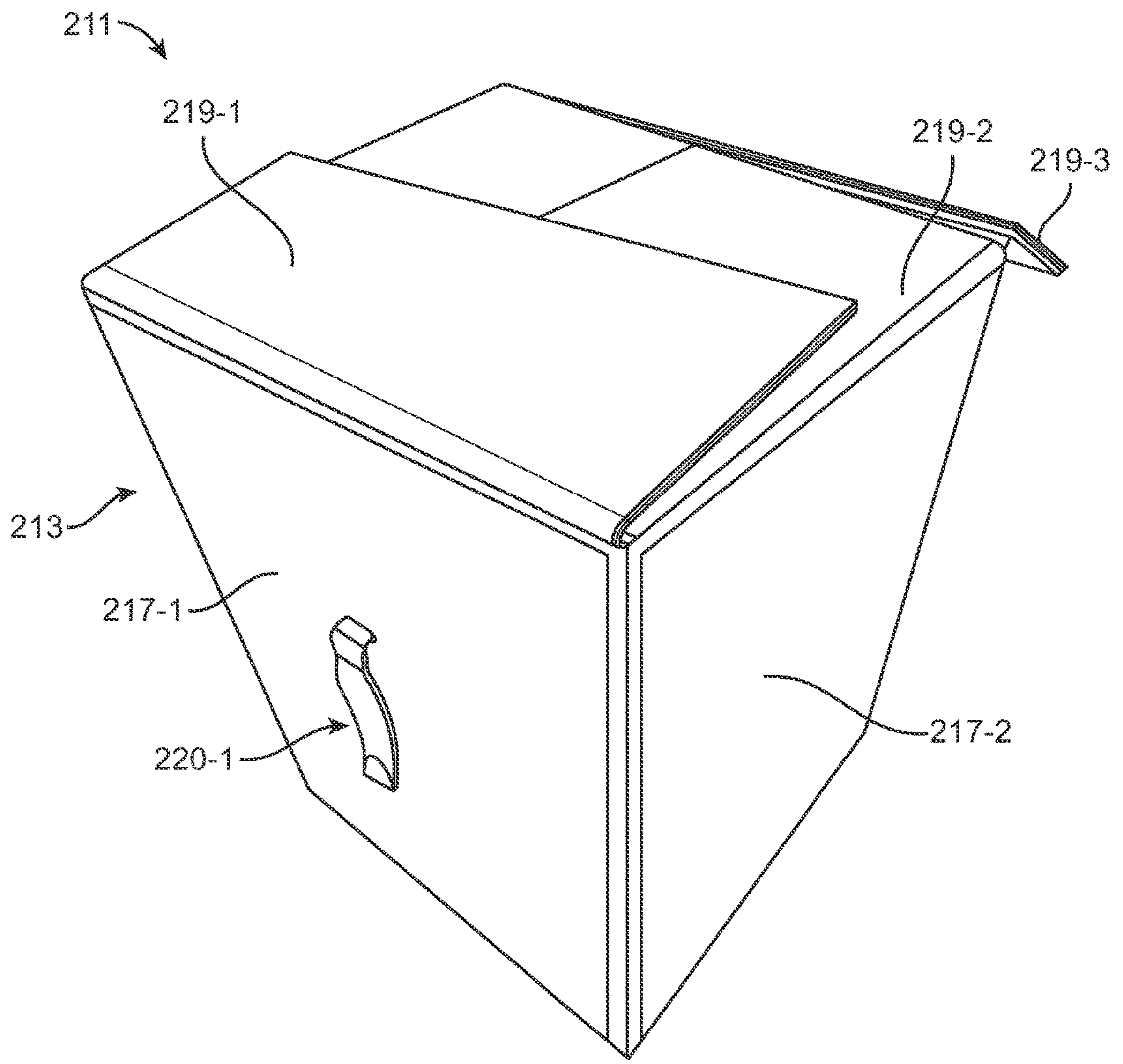
FIG. 18 is a fragmentary top perspective view of a second embodiment of a shipping system for maintaining temperature-sensitive materials within a desired temperature range for a period of time, the shipping system being constructed according to the present invention.
Figure 19A:
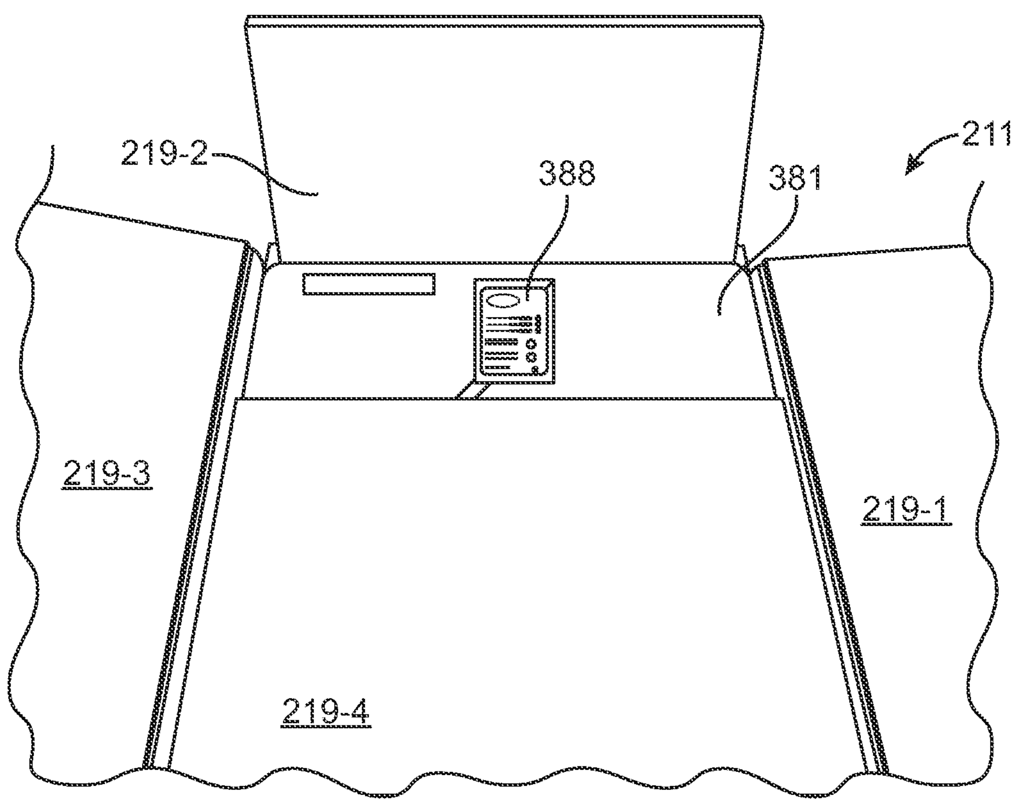
FIG. 19A is a fragmentary top perspective view of the shipping system of FIG. 18, with three of the top closure flaps of the outer box being shown in an open state.
Figure 19B:
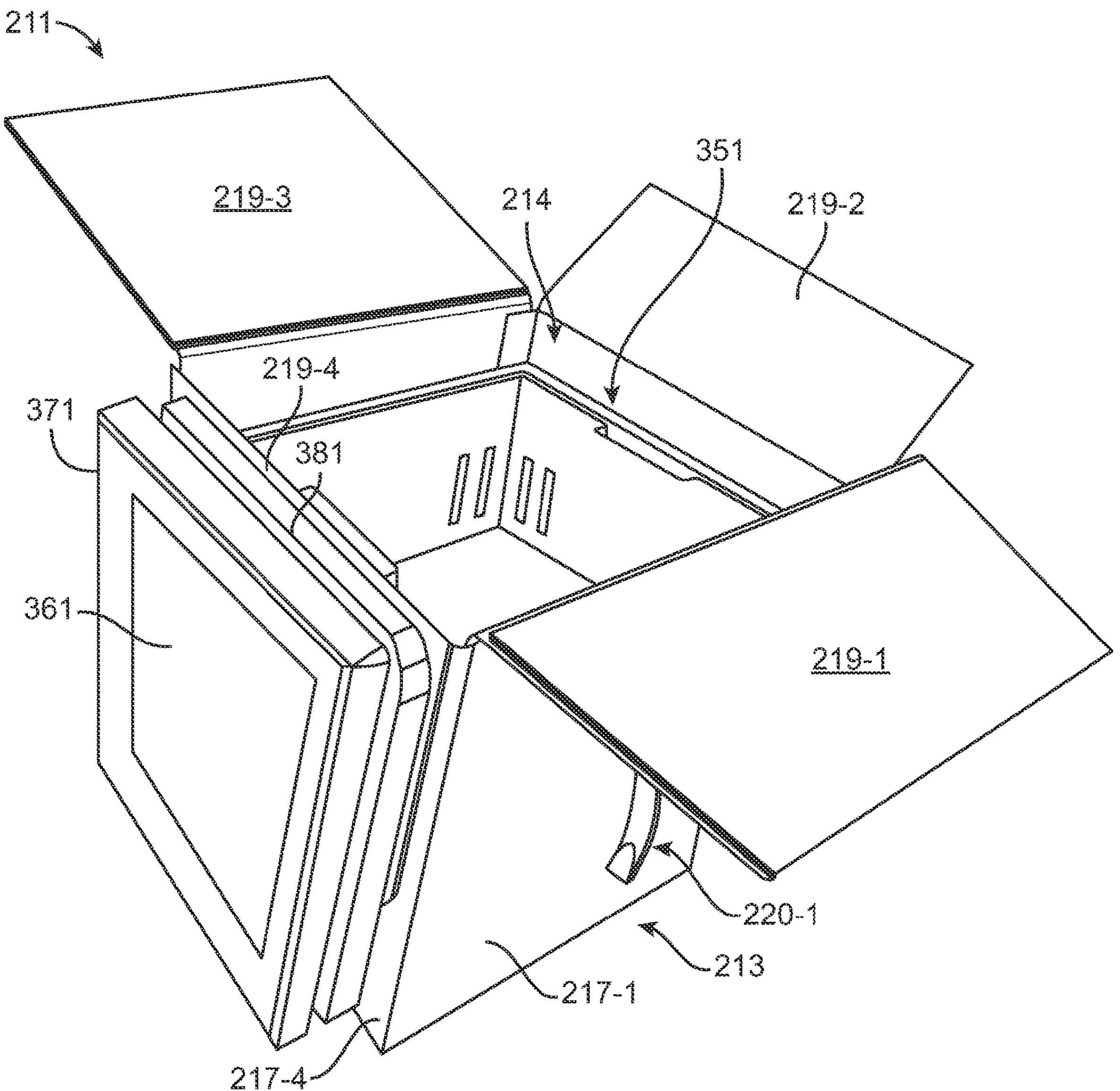
FIG. 19B is a fragmentary top perspective view of the shipping system of FIG. 18, with all four of the top closure flaps of the outer box being shown in an open state.

Referring now to FIGS. 18, 19A, and 19B, there are shown various views of a second embodiment of a shipping system for maintaining temperature-sensitive materials within a desired temperature range for a period of time, the shipping system being constructed according to the present invention and being represented generally by reference numeral 211. Details of shipping system 211 that are discussed elsewhere in this application or that are not critical to an understanding of the invention may be omitted from one or more of FIGS. 18, 19A, and 19B and/or from the accompanying description herein or may be shown in one or more of FIGS. 18, 19A, and 19B and/or described herein in a simplified manner.

Shipping system 211 may be similar in many respects to shipping system 11 and, unless otherwise noted, may be identical to shipping system 11.

Shipping system 211 may comprise an outer box 213 having a cavity 214. Outer box 213 may be similar in most respects to outer box 13 of shipping system 11. One difference between outer box 213 and outer box 13 may be that, whereas outer box 13 may comprise top closure flaps 19-1 through 19-4, wherein each of top closure flaps 19-1 through 19-4 may comprise a single layer (i.e., single wall) of corrugated cardboard, outer box 213 may comprise top closure flaps 219-1 through 219-4, wherein top closure flaps 219-2 and 219-4 may be similar or identical to top closure flaps 19-2 and 19-4, respectively, and wherein top closure flaps 219-1 and 219-3 may differ from top closure flaps 19-1 and 19-3, respectively, in that each of top closure flaps 219-1 and 219-3 may comprise a folded-over and glued together double layer (i.e., double wall) of corrugated cardboard. The provision of such a double layer of corrugated cardboard in top closure flaps 219-1 and 219-3 may be advantageous in endowing outer box 213 with increased strength, without increasing the thickness of outer box 213 along its side walls 217-1 through 217-4, thereby minimizing an increase in the overall length and width dimensions of system 211. Such increased strength may be advantageous, for example, if shipping system 211 is to be picked up by machinery that uses suction to pick up outer box 213 by its outermost top closure flaps 219-1 and 219-3.

Shipping system 211 may further comprise a first handle 220-1 mounted on side wall 217-1 and an identical second handle (not shown) mounted on side wall 217-3. Handle 220-1 may comprise a strap of material, such as polypropylene webbing, that may be inserted through and coupled to a backing plate to form a loop, with the loop positioned to the exterior of outer box 213 and with the backing plate positioned on, and preferably affixed to, the interior of outer box 213.

Figure 20:
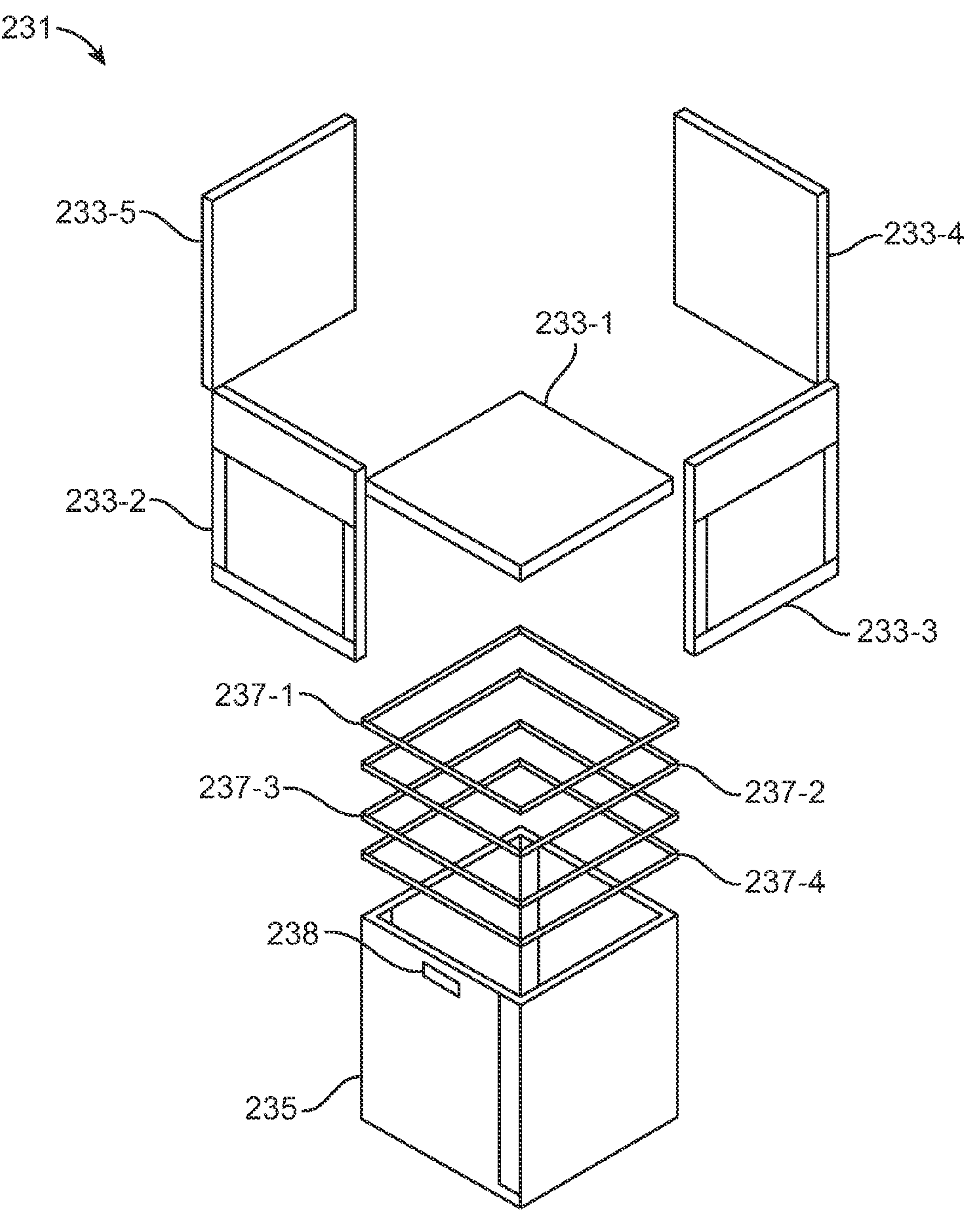
FIG. 20 is a partly exploded perspective view of the insulated base of the shipping system of FIG. 18.

Referring now to FIG. 20, shipping system 211 may comprise an insulated base 231, which may be removably disposed within cavity 214 of outer box 213. Insulated base 231, which may be generally similar to insulated base 51 of shipping system 11, may comprise a plurality of vacuum insulated panels 233-1 through 233-5, a support 235, and a plurality of straps 237-1 through 237-4.

Figures 21A, 21B, 21C:
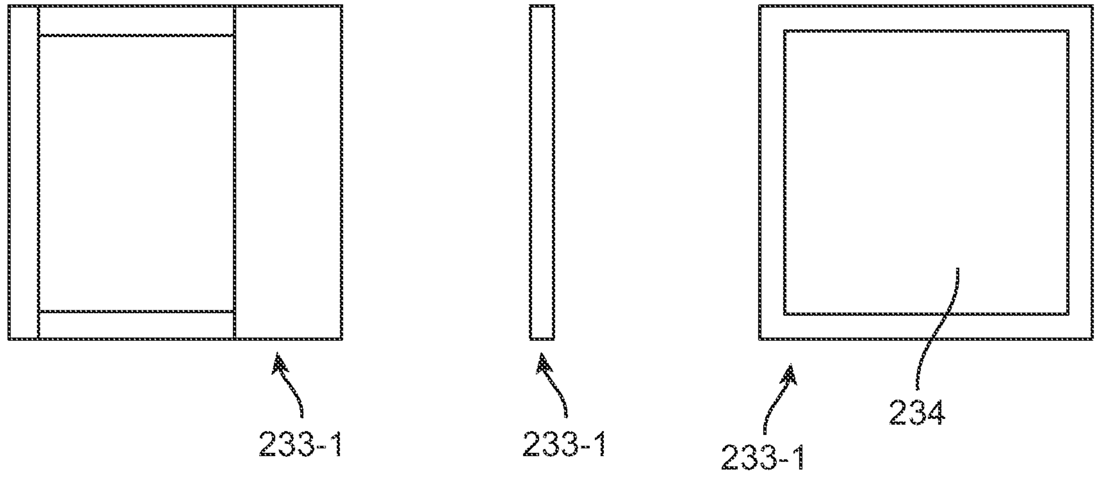
FIGS. 21A, 21B and 21C are bottom, side, and top views, respectively, of the bottom vacuum insulated panel shown in FIG. 20.

Panel 233-1, which is also shown separately in FIGS. 21A through 21C, may be generally similar to panel 53-1 and may have approximate dimensions of 14.95 in×14.95 in×1.00 in. Panel 233-1 may further include an HDPE (high density polyethylene) film 234, which film may serve to provide enhanced puncture resistance to panel 233-1. HDPE film 234, which may have approximate dimensions of 12.70 in×12.70 in×0.010-0.012 in, may be adhered to the panel under tape and may be centered along the inner facing (i.e., non-seam) major surface of panel 233-1.

Figures 22A, 22B, 22C:
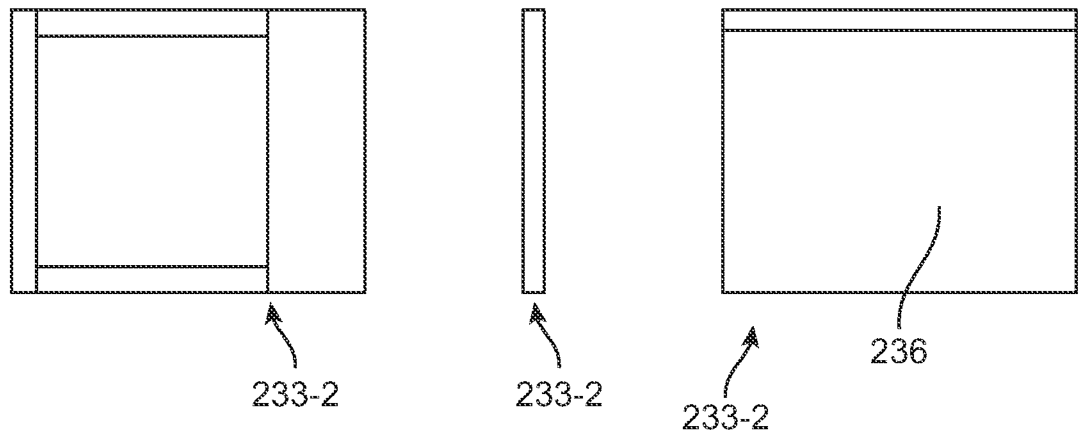
FIGS. 22A, 22B, and 22C are front, side, and rear views, respectively, of the left vacuum insulated panel shown in FIG. 20.

Panel 233-2, which is also shown separately in FIGS. 22A through 22C, may be generally similar to panel 53-2 and may have approximate dimensions of 13.95 in×17.50 in×1.00 in. Panel 233-2 may further include an HDPE (high density polyethylene) film 236, which film may serve to provide enhanced puncture resistance to panel 233-2. HDPE film 236, which may have a thickness of about 0.010-0.012 in, may be adhered to the panel under tape and may be positioned along the inner facing (i.e., non-seam) major surface of panel 233-2 while leaving a 17.50 in×1 in border along one edge.

Panels 233-2 through 233-5, which may be identical, may be positioned perpendicularly relative to and sitting directly on top of panel 233-1 to define a generally prismatic cavity bounded by a bottom wall and four side walls. The four side walls may be positioned relative to one another in a "pinwheel"-type arrangement. Alternatively, the four side walls may be positioned relative to one another so that one end of each of two parallel vacuum insulated panels abuts the inside major surface of each of the two remaining parallel vacuum insulated panels.

Figure 23:
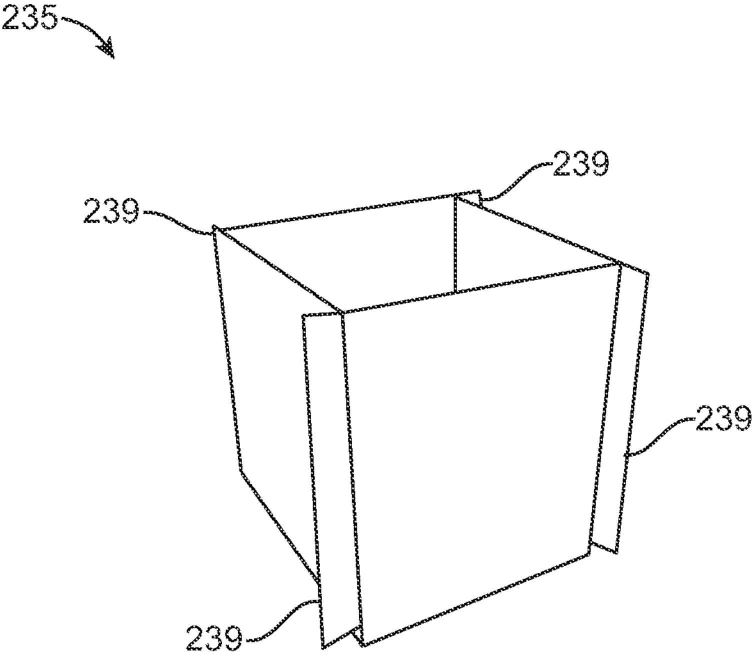
FIG. 23 is a perspective view of the support shown in FIG. 20.

Support 235, which is also shown separately in FIG. 23, may be generally similar to support 61. One difference between support 235 and support 61 may be that the side walls of support 235 may include extensions 239, which may be folded or wrapped around to an adjacent side wall, obviating the need for corner boards 71-1 through 71-4. A label 238 (see FIG. 20) may be affixed to support 235.

Figure 24:
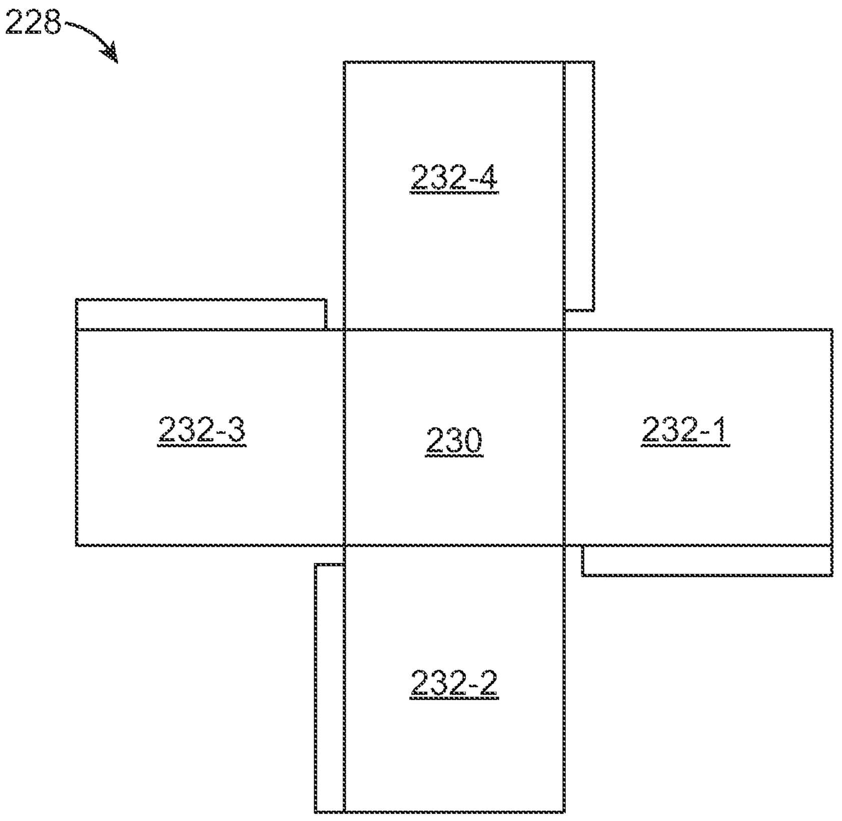
FIG. 24 is a top view of a blank that may be used to form the support shown in FIG. 23.

FIG. 24 shows a blank 232 that may be used to form support 235. As can be seen, blank 232 may include a central portion 230 and a plurality of side portions 232-1 through 232-4. Each of side portions 232-1 through 232-4 may include a tab that may be used as an extension 239. Exemplary dimensions of blank 232 may be as follows: Central portion 230 may have a length of approximately 15 in and a width of approximately 15 in. Each of side portions 232-1 through 232-4 may have a length of approximately 18.25 in and a width of approximately 15 in. Each of the tabs may have a length of approximately 17 in and a width of approximately 2 in.

Referring back to FIG. 20, straps 237-1 through 237-4, which may be identical or similar to straps 69-1 through 69-3, may be positioned around support 235. In one embodiment, straps 237-1 through 237-4 may be positioned around support 235 at distances of about 3.48 in, about 7.21 in, about 11.44 in, and about 14.67 in, respectively, from the top of support 235.

Figure 25:
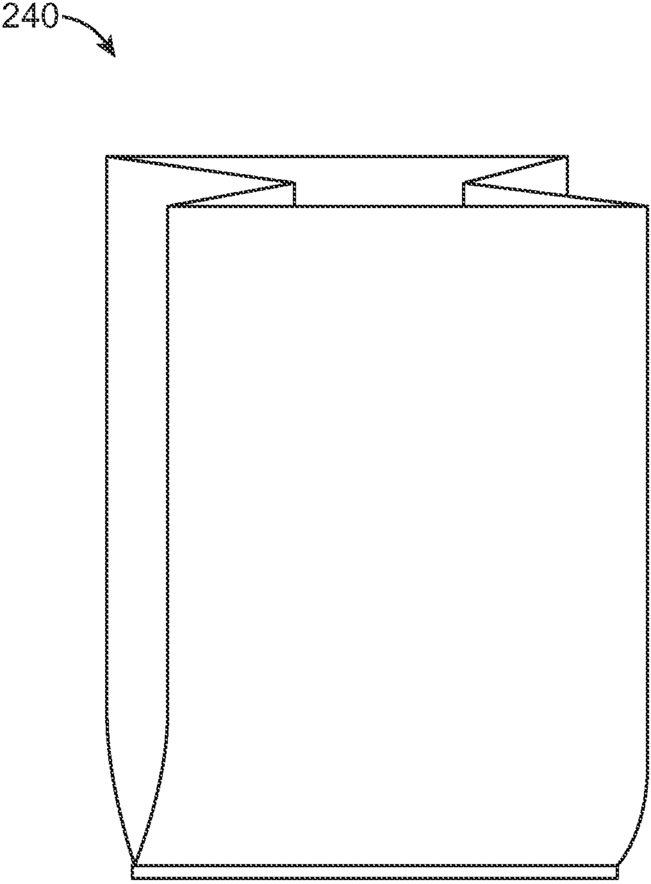
FIG. 25 is a perspective view of a baffle used in the shipping system of FIG. 18.

Insulated base 231 may be positioned within a baffle 240, which is shown in FIG. 25, Baffle 240 may be similar or identical to baffle 75 of shipping system 11. Preferably, the top ends of insulated base 231 and baffle 240 face in the same direction, with the open top end of baffle 240 terminating at about the same height as (or slightly above or slightly below) the open top end of insulated base 231. Preferably, baffle 240 and insulated base 231 are dimensioned so that the combination thereof may be snugly, yet removably, received within cavity 214 of outer box 213. Notwithstanding the above, some clearance may be provided between baffle 240 and outer box 213 to facilitate the insertion and removal of baffle 240 and insulated base 231 into and from outer box 213. In one embodiment, baffle 240 may be a gusseted polyethylene bag having a length of about 16.5 in, a width of about 15.5 in, a height of about 17 in, and a thickness of about 4 mil.

Figures 26A, 26B:
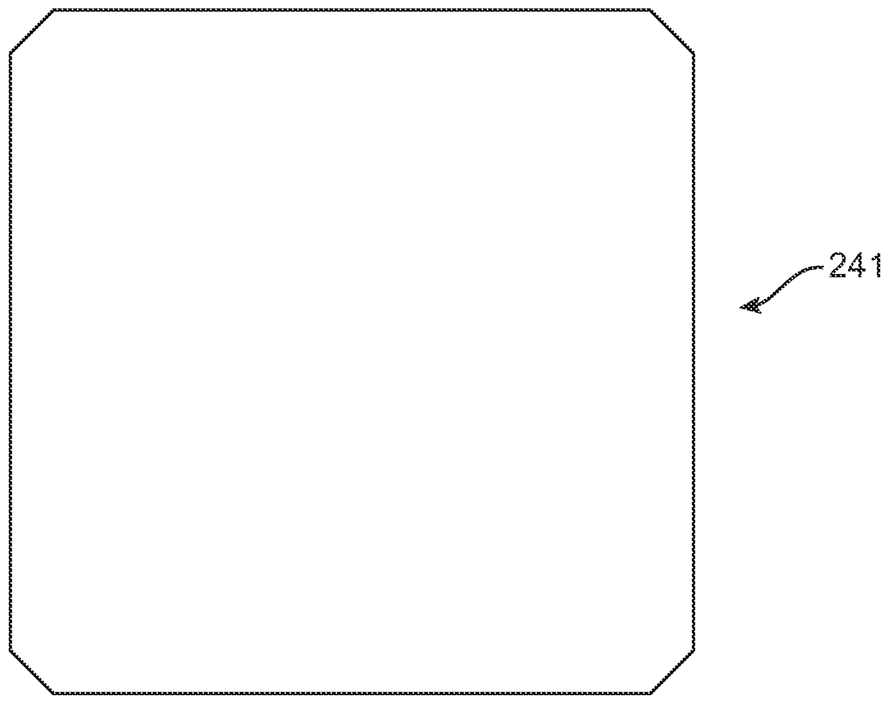
FIGS. 26A and 26B are top and side views, respectively, of a cushioning pad used in the shipping system of FIG. 18.
Figure 27A:
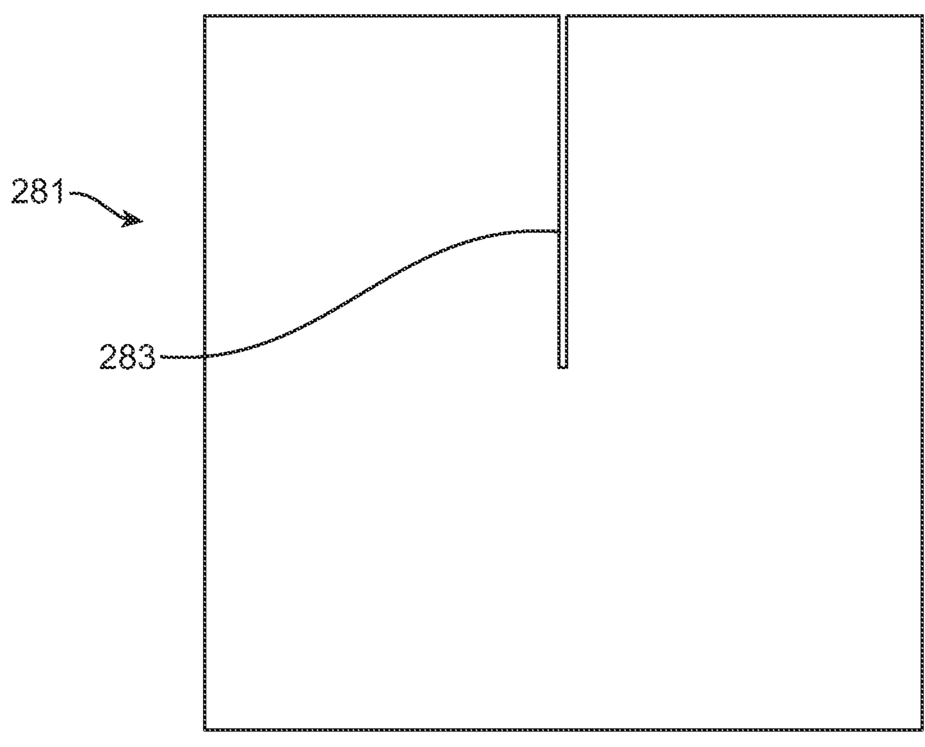
FIGS. 27A, 27B, and 27C are top, rear, and front views, respectively, of a probe pad used in the shipping system of FIG. 18.
Figure 27B:
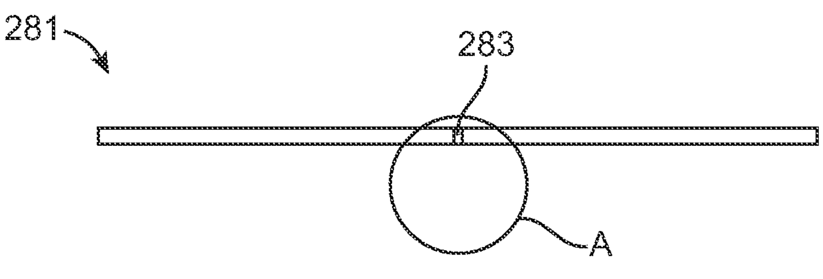
Figure 27C:
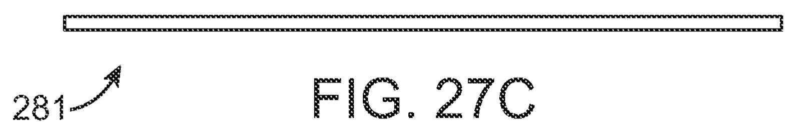
Figure 27D:
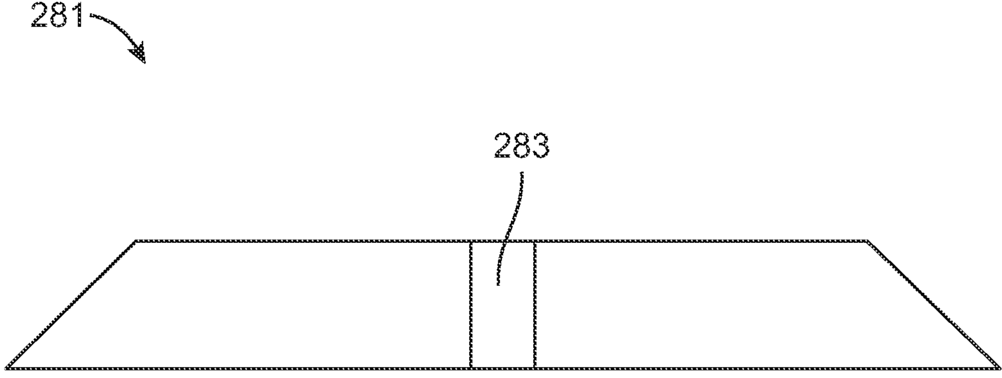
FIG. 27D is an enlarged fragmentary view of the circled portion of the probe pad labeled A shown in FIG. 27B.

The combination of insulated base 231 and baffle 240 may be positioned within cavity 214 of outer box 213 directly on top of a pad 241, which is shown separately in FIGS. 26A and 26B. Pad 241, which may be made of a polyethylene foam and which may have a density of about 1.7 lb/ft$^3$, may serve to provide additional cushioning to the shipping system. Pad 241 may be snugly, yet removably, seated at the bottom of cavity 214 of outer box 213. Exemplary dimensions of pad 241 may be approximately 15.25 in length×15.25 in width×0.50 in thickness. Pad 241 may have corners beveled at approximately 45 degrees with a length of approximately 0.75 in.

Shipping system 211 may further comprise a probe pad 281, which is shown in FIGS. 27A through 27D. Probe pad 281 may be a unitary (i.e., one-piece) or multi-piece substantially planar structure and may comprise, for example, a piece of foam insulation (e.g., polyethylene closed cell foam having a density of about 2 lb/ft$^3$) or the like. Probe pad 281 may be snugly, yet removably, positioned within the cavity of insulated base 231 directly on top of panel 233-1. Probe pad 281 may have a slot or cutout 283 for use in receiving a temperature probe (not shown). Probe pad 281 may also be used to help seal insulated base 231 in the areas where panels 233-2 through 233-5 meet panel 233-1. Notwithstanding the above, if desired, probe pad 281 may be omitted. Exemplary dimensions of probe pad 281 may include the following: length of approximately 12.94 in; width of approximately 12.94 in; and thickness of approximately 0.25 in. Slot 283 may be centered in probe pad 281 and may have a length of approximately 6.38 in and a width of approximately 0.13 in.

Shipping system 211 may further comprise a product box (not shown), which may be similar or identical to product box 99, and a conductive equalizer, which may be similar or identical to conductive equalizer 101. If desired, conductive equalizer 101 may be omitted.

Shipping system 11 may further comprise a divider 311, which is shown in FIGS. 28A through 28E. Divider 311, which may be removably disposed within the cavity of insulated base 231, may be a unitary (i.e., one-piece) or multi-piece structure and may be shaped to include a base 313 and a sleeve 315.

Base 313 may be a generally planar structure having a generally square footprint. Base 313 may be dimensioned to be seated directly on top of probe pad 281, with the periphery of base 313 engaging the inside surfaces of the side walls of insulated base 231. Notwithstanding the above, if desired, there may be some clearance between the periphery of base 313 and one or more of the side walls of insulated base 231. One or more ribs or ridges 317 may be provided along the top surface of base 313.

Sleeve 315, which may extend upwardly from base 313, may be a generally tubular structure having a generally square footprint. Sleeve 315 may comprise four side walls 321-1 through 321-4 having flared corners 323-1 through 323-4, an open top, and an open bottom. Side walls 321-1 through 321-4 and corners 323-1 through 323-4 may collectively define a cavity 325. (In another embodiment (not shown), sleeve 315 may have a closed or closeable bottom and/or a closed or closeable top.)

In the present embodiment, divider 311 may comprise a molded polymeric structure, preferably made of a material capable of withstanding dry ice temperatures (e.g., high density polyethylene (HDPE)); however, it is to be understood that divider 311 need not be a molded polymeric structure and may be made from other types of materials, such as cardboard or the like. Where divider 311 comprises a molded polymeric material, sleeve 315 may have a small upward draft angle, i.e., taper outwardly from bottom to top.

Sleeve 315 may be appropriately dimensioned so that a product box (or a plurality of product boxes or, if a conductive equalizer is used, the combination of one or more product boxes and one or more conductive equalizers) may be removably received in cavity 325. Preferably, cavity 325 is dimensioned so that there is a small amount of clearance between one or more side walls of the conductive equalizer and sleeve 315 to facilitate the insertion and removal of the conductive equalizer and the product box into and from sleeve 315. (Where the conductive equalizer is omitted from shipping system 211, there is preferably a small amount of clearance between one or more side walls of the product box and sleeve 315 to facilitate the insertion and removal of the product box into and from sleeve 315.) Where sleeve 315 has an upward draft angle, such clearance may increase upwardly. Notwithstanding the above, the amount of clearance between the conductive equalizer (or, where no conductive equalizer is present, the product box) and sleeve 315 is preferably small enough to minimize rotation or other movement of the product box (and conductive equalizer) relative to sleeve 315.

Figure 28A:
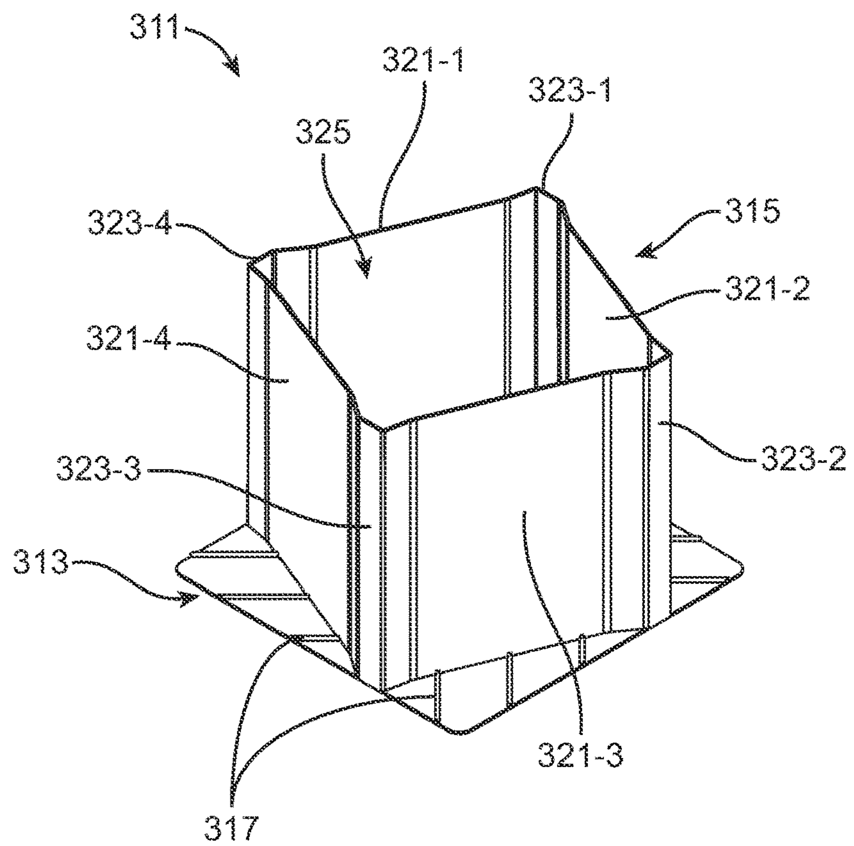
FIGS. 28A, 28B, 28C, 28D and 28E are top perspective, top, section, right side, and bottom views, respectively, of a divider used in the shipping system of FIG. 18.
Figure 28B:
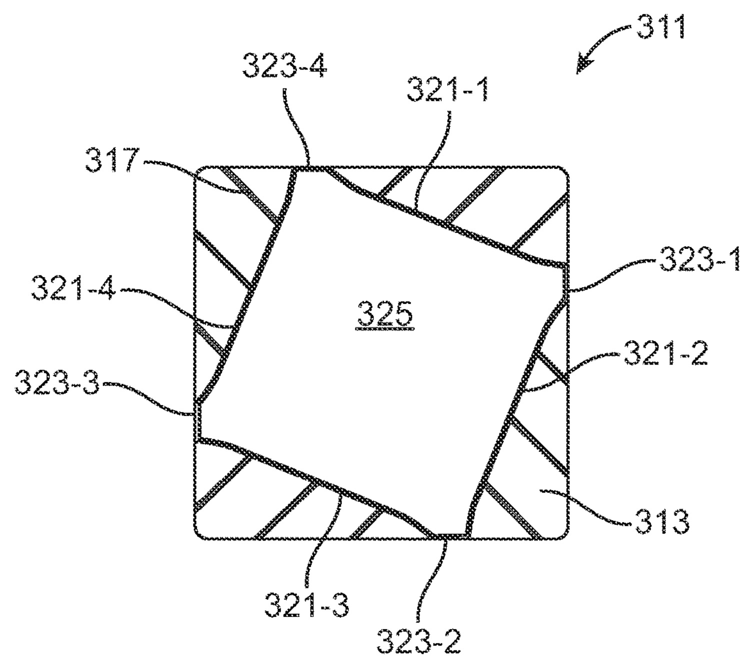
Figure 28C:
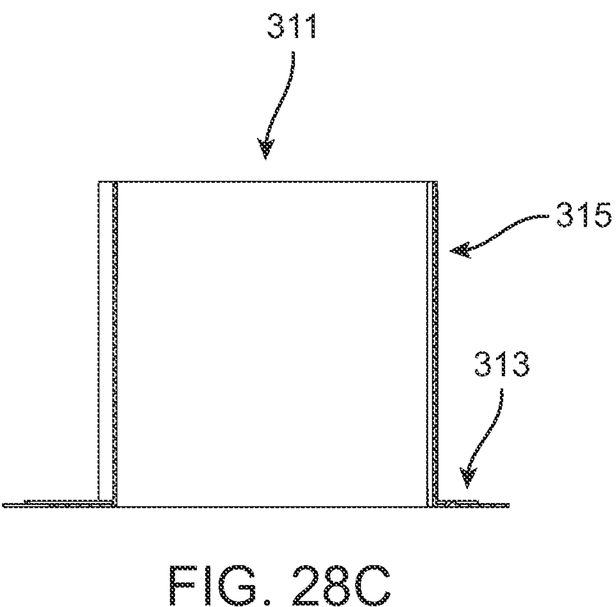
Figure 28D:
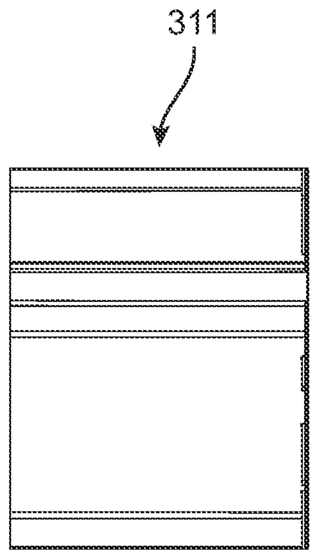
Figure 28E:
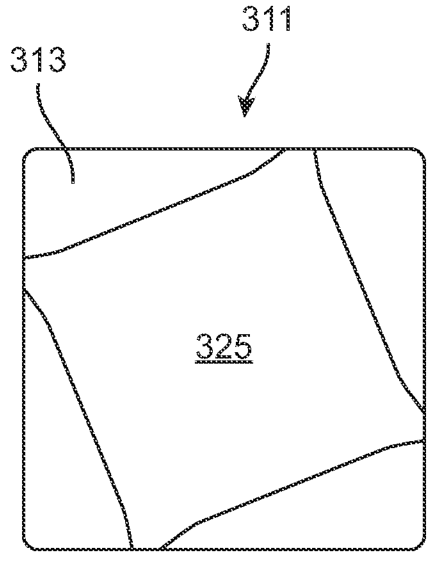
Figure 28E:
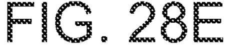

As seen best in FIG. 28B, sleeve 315 is preferably dimensioned so that a portion of each of corners 323-1 through 323-4 lies flush (or approximately flush) with the periphery of base 313. In this manner, not only may base 313 be used to engage some or all of the inside walls of insulated base 231, thereby minimizing rotation or other movement of divider 311 relative to insulated base 231, but corners 323-1 through 323-4 may also be used to engage some or all of the inside walls of insulated base 231 to minimize such rotation or other movement. The outward flaring of corners 323-1 through 323-4 relative to sides 321-1 through 321-4 also may facilitate the removal of a payload box (or payload box and conductive equalizer) from sleeve 315 by permitting an operator to insert the operator's fingers or the like into sleeve 315.

In the present embodiment, sleeve 315 is preferably dimensioned so that corners 323-1 through 323-4 simultaneously engage all four side walls of insulated base 231. In this manner, four partially or completely discrete cavities of generally equal volume may be formed by the combination of base 313, sleeve 315 and insulated base 231. Such cavities may be generally triangular in horizontal cross-section, and each of said cavities may receive a quantity of a phase-change or temperature-regulating material, such as pelletized dry ice. It is believed that the triangular shape of the cavities is particularly advantageous in maximizing the cooling effect of pelletized dry ice or other cooling agent positioned within the cavities. In addition, the triangular shape of the cavities also facilitates the automated loading of pelletized dry ice thereinto as it affords a wider space to receive the pelletized dry ice than would be the case if sleeve 315 and insulated base 321 were rotationally aligned (i.e., not offset rotationally). However, notwithstanding the above, the present invention is not to be limited to the present embodiment. Accordingly, for example, one or both of sleeve 315 and insulated base 231 may be shaped to have a horizontal cross-section that is not square or generally square; in such a case, sleeve 315 and insulated base 231 may be dimensioned, and sleeve 315 may be offset relative to insulated base 231, such that some or all of the corners of sleeve 315 may contact a corresponding side of insulated base 231.

Exemplary dimensions of divider 311 may include the following: divider 311 may have a height of approximately 10 in; base 313 may have a width of approximately 12.8 in, a width of approximately 12.8 in, and a thickness of approximately 0.10 in; sleeve 315 may have an inner length of approximately 9.7 in and an inner width of approximately 9.7 in.; and cavity 325 may have a volume of about 10-15 liters.

Also, in the present embodiment, sleeve 315 may be oriented along its longitudinal axis (extending between its open top end and its open bottom end) to be at approximately a 22 degree offset angle relative to the longitudinal axis of base 313. In this manner, sleeve 315 may be rotationally oriented relative to insulated base 231 to be at the aforementioned approximately 22 degree offset angle. Notwithstanding the above, sleeve 315 need not be rotationally oriented relative to insulated base 231 to be at an approximately 22 degree offset angle. Rather, for example, sleeve 214 could be rotationally oriented relative to insulated base 231 to be at a different offset angle, such as an approximately 45 degree offset angle. Nevertheless, one advantage of sleeve 315 being at a 22 degree offset angle, as opposed to a 45 degree offset angle, is that the footprint within sleeve 315 may be greater at a 22 degree offset angle than at a 45 degree offset angle.

Figure 29:
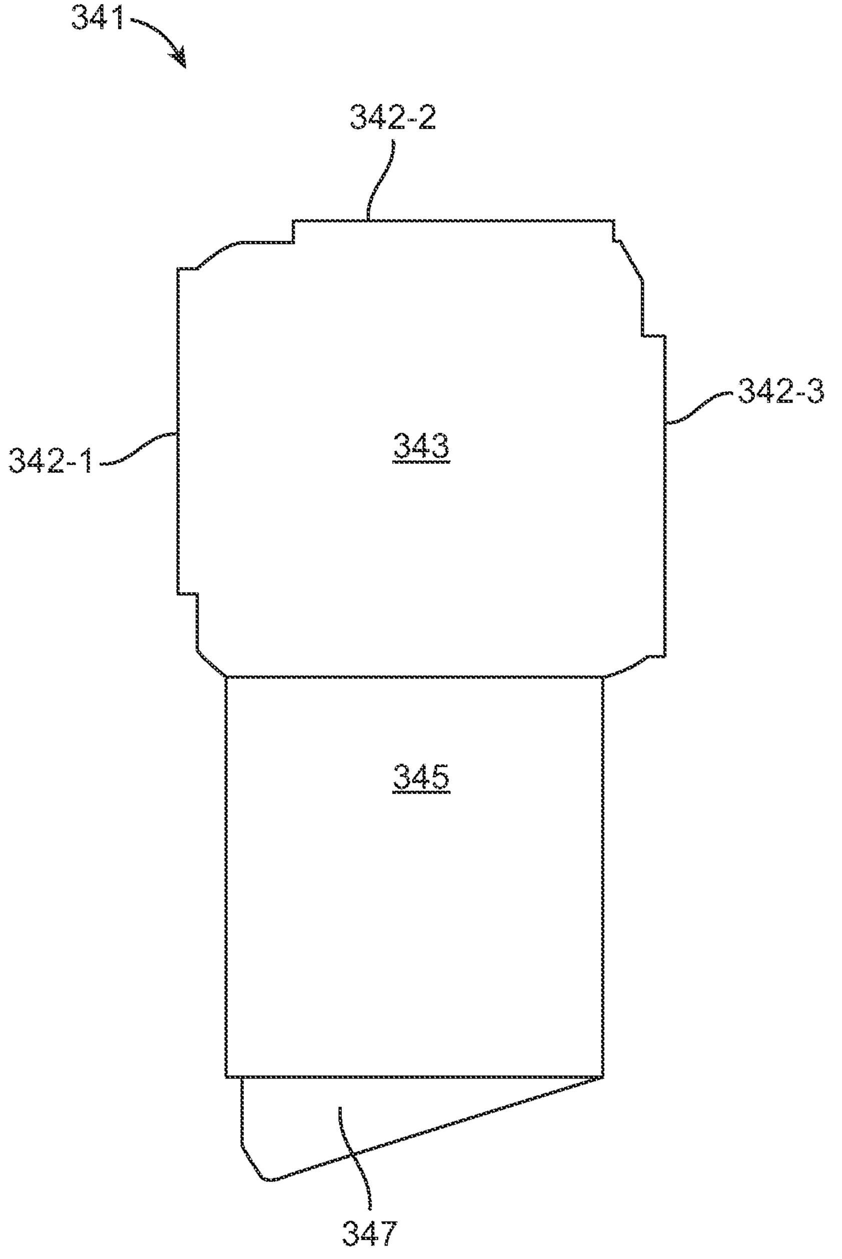
FIG. 29 is a top view of a guide used in the shipping system of FIG. 18, the guide being shown in an unfolded state.
Figure 30A:
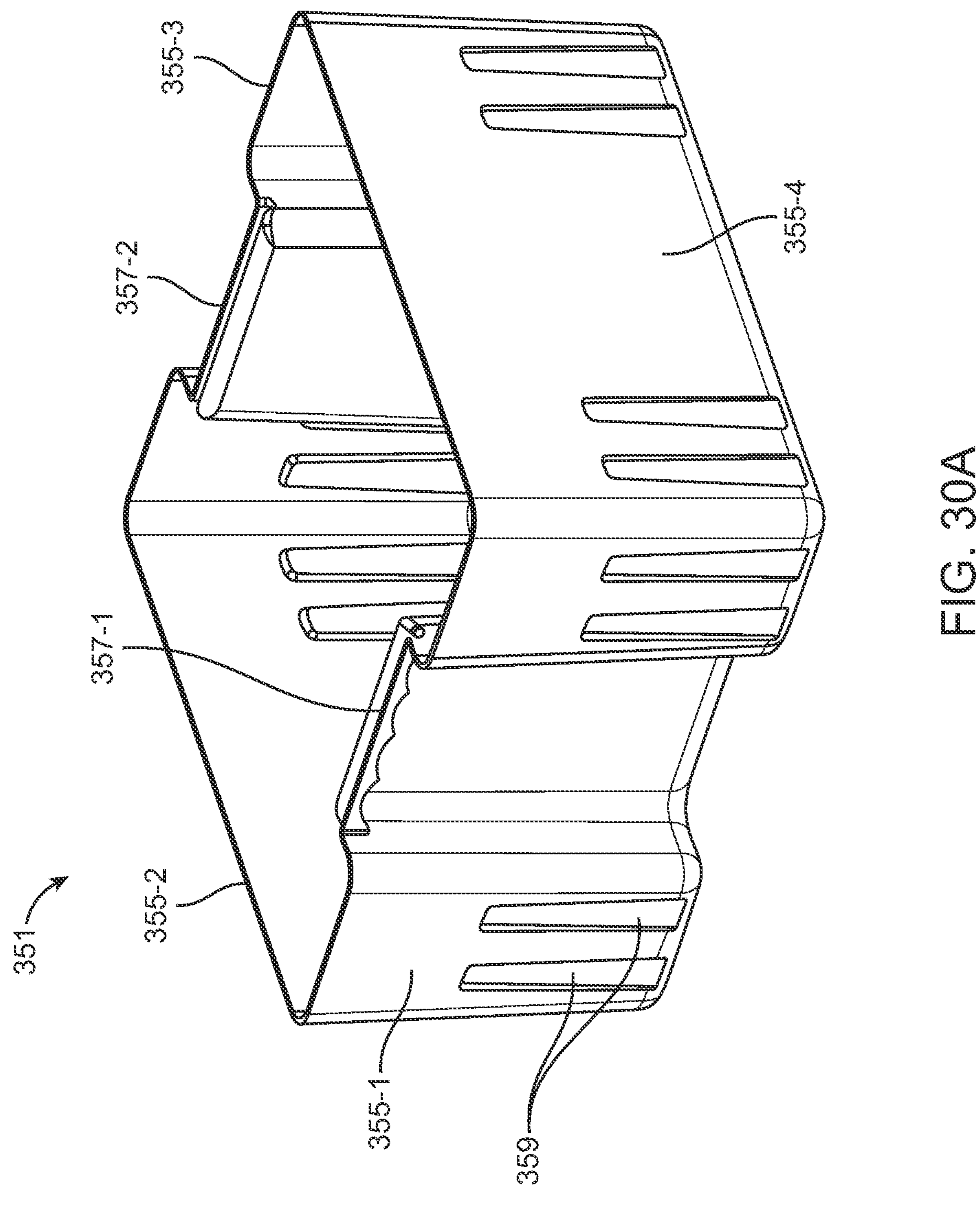
FIGS. 30A, 30B, 30C and 30D are perspective, bottom, longitudinal section, and lateral section views, respectively, of a tray used in the shipping system of FIG. 18.
Figures 30B, 30C, 30D:
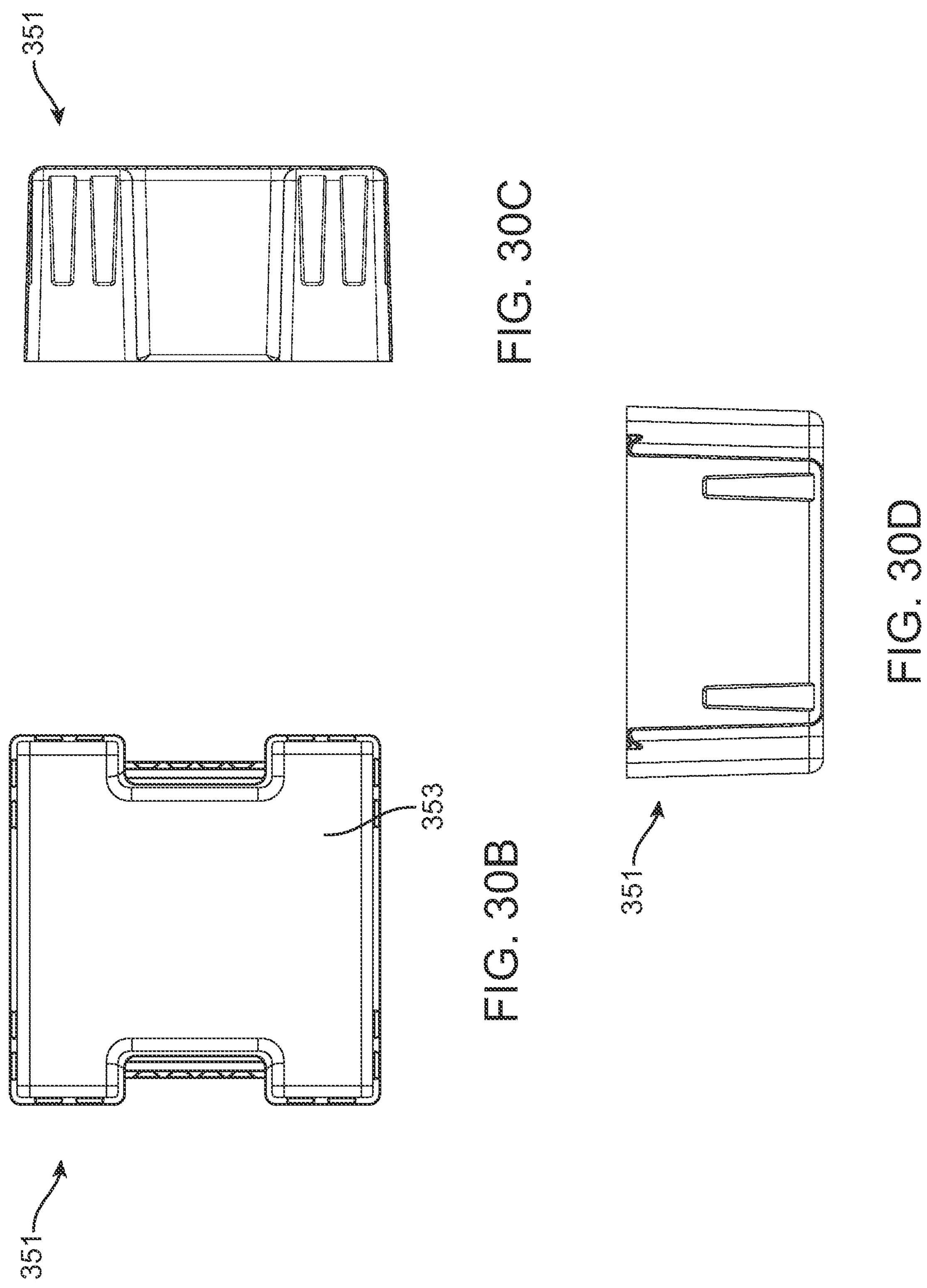

Shipping system 211 may further comprise a guide 341, which is shown in FIG. 29. Guide 341 may be a unitary (i.e., one-piece) or multi-piece structure and may be shaped to include a top panel 343, a side panel 345, and a bottom panel 347. In the present embodiment, guide 341 may be made of corrugated cardboard or, alternatively, may be made from one or more other types of materials, such materials preferably being capable of withstanding dry ice temperatures. Preferably, guide 341 is dimensioned so that top panel 343 covers the top end of sleeve 315. Consequently, top panel 343 may engage the vertical side walls of insulated base 231 in a manner similar to the manner in which sleeve 315 does. Moreover, in addition to substantially matching the footprint of sleeve 315 in the portions of sleeve 315 corresponding to corners 323-1 through 323-4 of sleeve 315, top panel 343 of guide 341 may include sides 342-1 through 342-3 that may extend slightly beyond sleeve 315 in one or more of the portions of sleeve 315 corresponding to side walls 321-1 through 321-4. Such an extension of top panel 343 may cause top panel 343 to engage portions of insulated base 231, thereby minimizing rotation of guide 341 relative to sleeve 315 and, in so doing, minimizing unwanted gaps in the coverage of sleeve 315 by guide 341 by which dry ice or the like could undesirably be dropped into or otherwise enter cavity 325 of sleeve 315.

Guide 341 may also be dimensioned so that bottom panel 347 may engage insulated base 231 at or near a lower inside corner thereof. Consequently, by placing top panel 343 of guide 341 on top of sleeve 315 and by placing bottom panel 347 on top of base 313 and into engagement with insulated base 231 (with side panel 345 extending generally vertically between top panel 343 and bottom panel 347), guide 341 may serve to keep sleeve 315, and the contents thereof, from rotating relative to insulated base 231.

In the present embodiment, guide 341 is not fastened to sleeve 315; however, it is to be understood that guide 341 may be fastened to sleeve 315 by any one or more suitable types of fastener (e.g., mechanical fasteners, adhesives, etc.).

Shipping system 211 may further comprise a tray 351, which is shown in FIGS. 30A through 30D. Tray 351 may be a unitary (i.e., one-piece) or multi-piece structure and may be shaped to include a bottom 353 (which may be substantially flat), a plurality of sides 355-1 through 355-4, and an open top. In the present embodiment, tray 351 may be made of one or more molded polymers or, alternatively, may be made from one or more other types of materials. Preferably, tray 351 is made of a material capable of withstanding dry ice temperatures (e.g., HDPE, corrugated cardboard, etc.). Tray 351 may have a small draft angle, i.e., taper outwardly from bottom to top. Tray 351 may sit within insulated base 231 directly on top of top panel 343 of guide 341. Preferably, tray 351 is dimensioned so that its footprint substantially matches that of the interior of insulated base 231, except for a pair of recessed areas 357-1 and 357-2 in sides 355-1 and 355-3, respectively, that may serve as handles. In addition, tray 351 is preferably dimensioned so that its top edge lies substantially flush with, or just below, the top edge of insulated base 231. As will be described further below, tray 351 may be used to hold a quantity of pelletized dry ice or another temperature-regulating or phase-change material. A plurality of recesses 359 may be provided along the exterior of sides 355-1 through 355-4. Recesses 359 may provide some flexibility (or additional flexibility) to sides 355-1 through 355-4 and, in so doing, may enable a plurality of trays 351 to be nested vertically within one another (or to be nested vertically within one another to a greater extent), thereby reducing the space needed to transport or to store a plurality of trays 351. Notwithstanding the above, if desired, tray 351 may be omitted.

Exemplary dimensions of tray 351 may include the following: outer length of approximately 12.75 in; outer width of approximately 12.75 in; outer height of 6.75 in; length of recess 359 approximately 4.77 in; and width of recess 359 approximately 1 in.

Figure 31A:
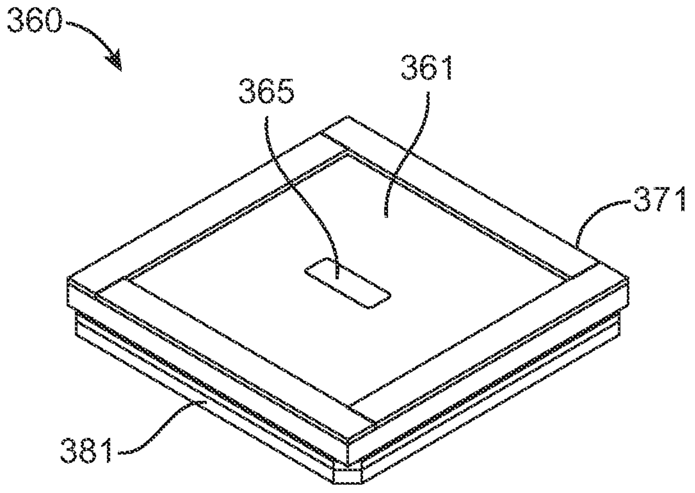
FIGS. 31A, 31B and 31C are bottom perspective, top perspective, and exploded perspective views, respectively, of a lid assembly used in the shipping system of FIG. 18.
Figure 31B:
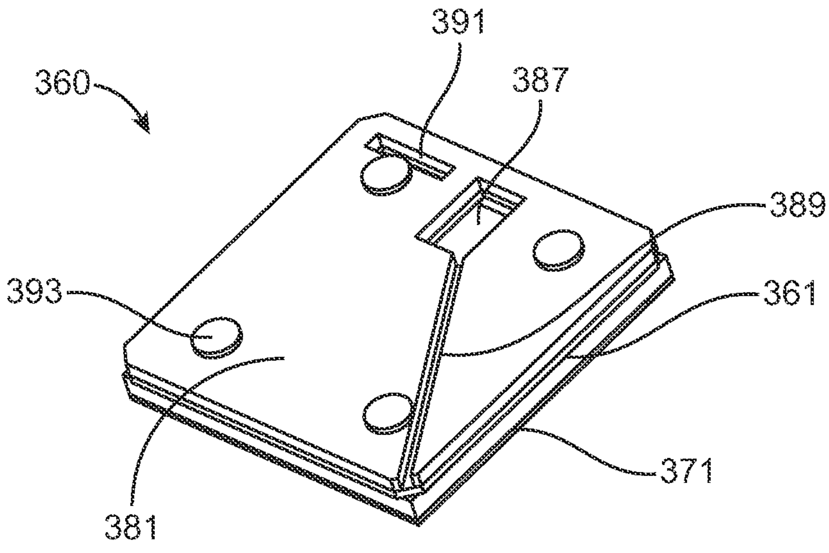
Figure 31C:
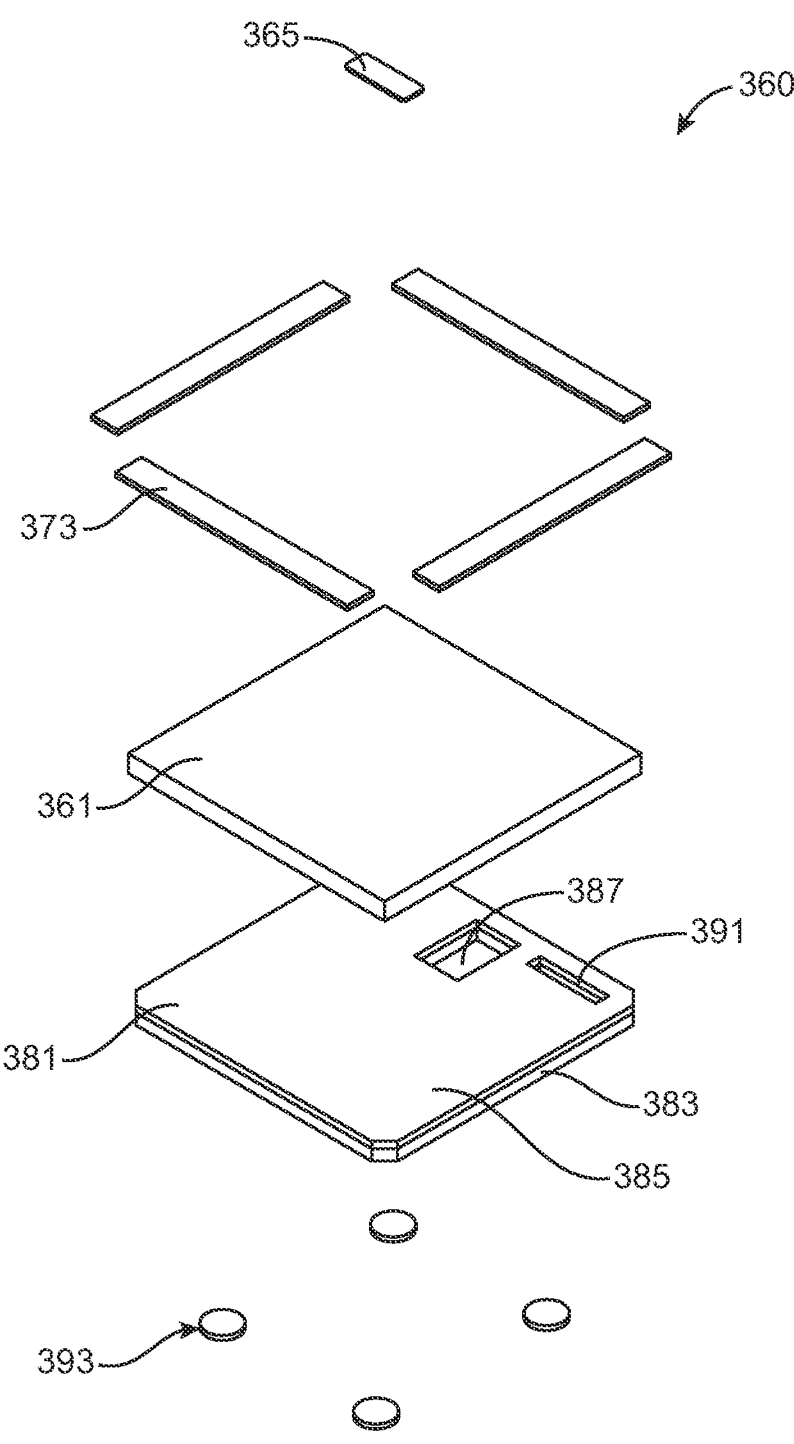

Shipping system 211 may further comprise a lid assembly 360, which is shown in FIGS. 31A through 31C. Lid assembly 360 may comprise an insulated cover 361, a gasket 371, and a top pad 381.

Insulated cover 361 may be a vacuum insulated panel that may be similar or identical in construction to vacuum insulated panel 233-1; however, it is to be understood that insulated cover 361 need not be a vacuum insulated panel and, instead, may be made of one or more alternative types of insulation (e.g., foam insulation, etc.). Insulated cover 361 preferably has a footprint that substantially matches that of insulated base 231 such that, when shipping system 211 is in a fully assembled and closed state, insulated cover 361 may be positioned over and may align with insulated base 231, thereby closing the cavity of insulated base 231. A label 365 may be secured to the bottom face of insulated cover 361.

Shipping system 211 may further comprise a gasket 371. Gasket 371 may comprise a unitary (i.e., one-piece) or multi-piece structure made of rubber or another suitable material. In the present embodiment, gasket 371 may be a multi-piece structure comprising a plurality of strips 373 of material arranged to form a frame or similar structure. More specifically, gasket 371 may comprise four such strips 373, wherein each strip 373 may comprise an adhesive-backed neoprene having a length of approximately 13.50 in, a width of approximately 1.50 in, a thickness of approximately 0.25 in, and a density of approximately 6 lb/ft$^3$. Gasket 371 may be secured, using said adhesive, to the bottom surface of insulated cover 361 proximate to its perimeter so that, when shipping system 211 is in a fully assembled and closed state, gasket 371 may be disposed between insulated base 231 and insulated cover 361 and may also frictionally engage outer box 213 to create a seal such that gasket 371 may serve to minimize fluid communication between the interior and the exterior of shipping system 211. Notwithstanding the above, if desired, gasket 371 may be omitted.

Shipping system 211 may further comprise a top pad 381. Top pad 381 may be a unitary (i.e., one-piece) or multi-piece structure made of polyethylene foam or another suitable material. In the present embodiment, top pad 381 may be a two-piece structure comprising a top layer 383 and a bottom layer 385 that are glued together. The top surface of insulated cover 361 may be secured to the bottom surface of top pad 381 by suitable means (not shown), such as an adhesive or hook and loop fasteners (as in U.S. Patent Application Publication No. US 2018/0328644 A1, which is incorporated herein by reference). Top pad 381 may be shaped to include a first cutout 387, which may be used to receive a data logger 388 (see FIG. 19A) or similar device, a second cutout 389, which may be used to receive the cable (not shown) for data logger 388, and a third cutout 391, which may be used as a handle into which a user may insert one or more fingers to move lid assembly 360. A portion of the top surface of top pad 381 may be secured, preferably removably, to the bottom surface of top flap 219-4 of outer box 213 using a plurality of fasteners 393, which may be adhesive, hook/loop, or the like. As can be appreciated, by removably securing top pad 381 to outer box 213, one may replace outer box 213 while reusing top pad 381 (as well as the other components of lid assembly 360). Notwithstanding the above, if desired, top pad 381 may be omitted.

Figure 32A:
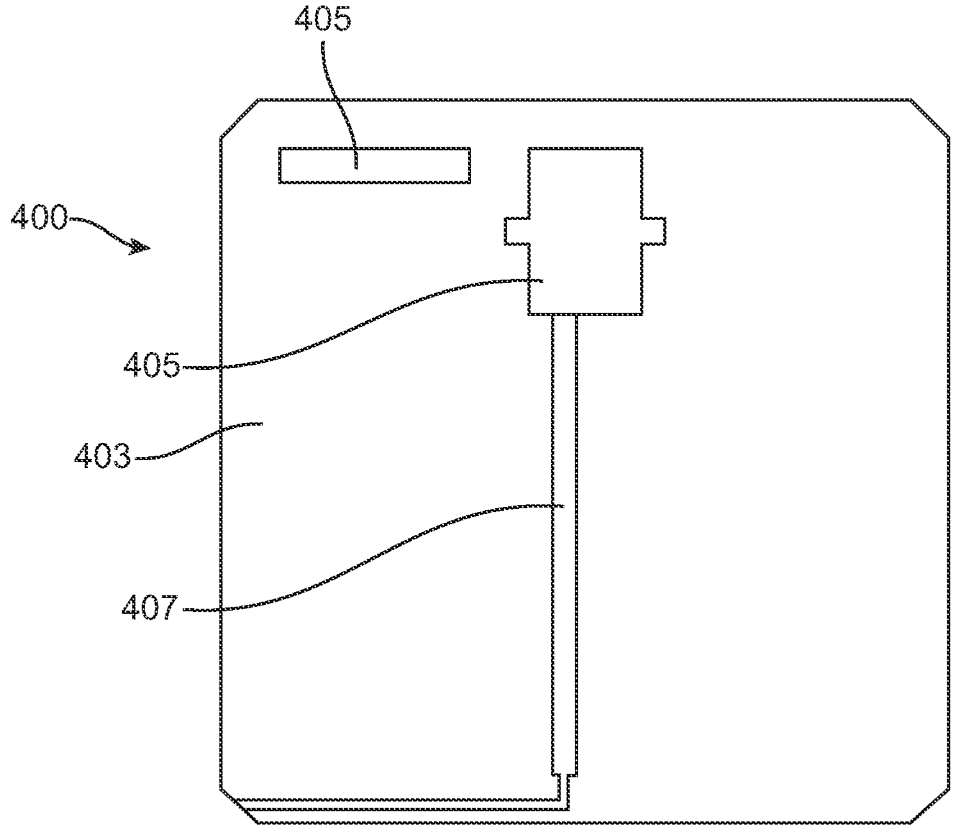
FIGS. 32A and 32B are top and corner end views, respectively, of an alternative embodiment to the top pad shown in FIG. 31A.
Figure 32B:
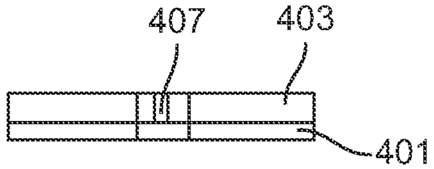

An alternative embodiment of a top pad is shown in FIGS. 32A and 32B and is represented generally by reference numeral 400. Top pad 400 may be generally similar to top pad 381 and may comprise a bottom layer 401 and a top layer 403. Bottom layer 401 may be generally similar to bottom layer 385 of pad 381. Top layer 403 may be similar in many respects to top layer 383 of pad 381 and may include a cutout 405 that is similar to cutout 391 of top layer 383. Top layer 403 may also comprise a cutout 405 and a cutout 407. Cutout 405 may be used for a data logger, and cutout 407 may be used to receive a cable for a data logger.

As noted above, shipping system 211 may further comprise pelletized dry ice or another suitable phase-change or temperature-regulating material. Where pelletized dry ice is used, a first quantity of pelletized dry ice (e.g., approximately 7.5 kg) may be distributed, preferably substantially equally, amongst the four cavities formed between divider 311 and insulated base 231, and a second quantity of pelletized dry ice (e.g., approximately 11 kg) may be positioned within tray 351.

If kept closed, shipping system 211 may be used to maintain a payload at a temperature of minus 90° C. to minus 60° C. for approximately 8-9 days. Alternatively, if periodically opened to remove product, shipping system 211 may maintain a payload within the aforementioned temperature range for several weeks, provided that re-icing of the system is performed at least once a week.

Shipping system 211 may have outer dimensions of approximately 15-16 in (length)×approximately 15-16 in (width)×approximately 20-21 in (height) and more specifically of about 15¾ in (length)×about 15¾ in (width)×about 20⅛ in (height).

Figure 33:
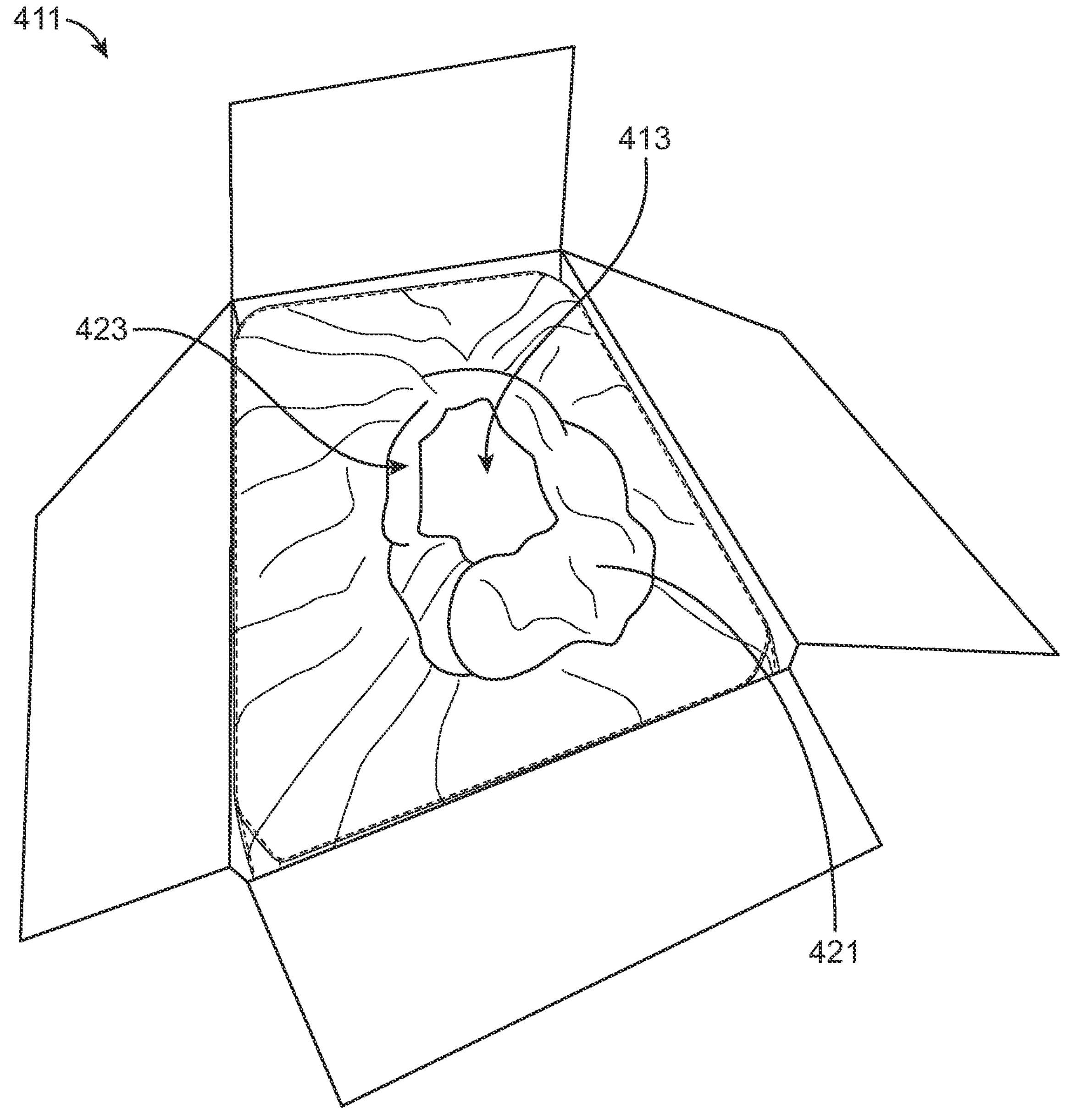
FIG. 33 is a fragmentary top perspective view of a third embodiment of a shipping system for maintaining temperature-sensitive materials within a desired temperature range for a period of time, the shipping system being constructed according to the present invention.

Referring now to FIG. 33, there is shown a fragmentary top perspective view of a third embodiment of a shipping system for maintaining temperature-sensitive materials within a desired temperature range for a period of time, the shipping system being constructed according to the teachings of the present invention and being represented generally by reference numeral 411. Details of shipping system 411 that are discussed elsewhere in this application or that are not critical to an understanding of the invention may be omitted from FIG. 33 and/or from the accompanying description herein or may be shown in FIG. 33 and/or described herein in a simplified manner.

Shipping system 411 may be similar in many respects to shipping system 211 and, unless otherwise noted, may be identical to shipping system 211.

One difference between shipping system 411 and shipping system 211 may be that, whereas shipping system 211 may comprise a lid assembly 360 that may be fastened or otherwise coupled to one of the top closure flaps of the outer box 213 (e.g., top closure flap 219-4), shipping system 411 may comprise a lid assembly 413 that may be similar to lid assembly 360 but is preferably not coupled to one of the top closure flaps of its outer box.

Another difference between shipping system 411 and shipping system 211 may be that, whereas shipping system 211 may comprise a baffle 240 that is preferably dimensioned to extend upwardly to about the same height as the top of insulated base 231, shipping system 411 may comprise a baffle 421 that may be dimensioned to extend upwardly considerably beyond the top of insulated base 231. In fact, in the present embodiment, baffle 421 may be dimensioned so that both insulated base 231 and lid assembly 413 may be inserted into baffle 421. (Alternatively, in another embodiment (not shown), the top pad of the lid assembly 413 may be separate from the top vacuum insulated panel, with the top pad removably coupled to one of the top closure flaps of the outer box (as in system 211) and with the top vacuum insulated panel and its associated gasket positioned within baffle 421.) Baffle 421 may be dimensioned, folded, or otherwise constructed to include a top opening 423, which may be substantially centered over the top of lid assembly 413. Opening 423 may be adjustable in size (e.g., using a cinching mechanism like a drawstring or using some other mechanism) to permit lid assembly 413 to be inserted into and removed from baffle 421. In the present embodiment, opening 423 may have a minimum diameter of about 3-4 in.

It is believed that a baffle that is dimensioned like baffle 421 to receive both the insulated base and at least the top vacuum insulated panel of the lid assembly (i.e., a "6-sided" baffle) may be better in minimizing supercooling than a baffle like 240 that is dimensioned to receive only the insulated base and not the top vacuum insulated panel (i.e., a "5-sided" baffle).

Shipping system 411 may include, but need not include, a conductive equalizer for receiving the product box.

It is to be understood that components or features of shipping systems 11, 211 and 411 may be combined or substituted for one another in ways not specifically disclosed herein.

Some desirable features, attributes and/or advantages of one or more of shipping systems 11, 211 and 411 are as follows:

- Placing the product box in a sleeve that is smaller than the insulated base, and orienting the sleeve 45°, 22° or at some other offset angle relative to the insulated base creates four cavities, preferably of equal size, in the corners that allow easier and more uniform addition of dry ice than if the product box were just placed centrally and an attempt made to uniformly fill the space between it and the insulated base.
- The guide helps to maintain the 45°, 22° or other offset angle orientation of the sleeve and prevents the sleeve from rotating in transit, especially once the dry ice starts to sublimate and has more freedom to move.
- The design of the present shipping system is particularly advantageous if the shipping system rolls and/or is turned multiple times.
- The use of a unitary sleeve, requiring no assembly, that both locates the payload and that defines cavities to receive dry ice is advantageous.
- The plastic tray filled with dry ice placed on top of the sleeve is a preferred embodiment and may be omitted.
- The gasket added to the lid is a preferred embodiment and may be omitted.
- The insulated base and/or the sleeve does not need to be square in horizontal cross-section, and the insulated base and the sleeve do not need to be offset by exactly 45 degrees or 22 degrees. A key is creating cavities that are sufficiently wide that they can easily be filled in an automated fashion with phase-change material (e.g., pelletized dry ice).
- The shipping system of the present invention is well-suited not only for the transportation of temperature-sensitive materials but also for the long-term storage of temperature-sensitive materials. For example, one could periodically refill the tray and/or the coolant cavities with dry ice or other coolant material and could continue to use the shipping system in a manner analogous to how one would typically use an electrically-powered freezer, i.e., removing portions of the temperature-sensitive materials as needed. Moreover, by using a removable tray, one has easy access to the payload in a way that would not be possible if the payload were buried directly under a loose mass of dry ice (which loose mass would have to be moved to the side in order to access the payload).

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for maintaining temperature-sensitive materials within a desired temperature range for a period of time, the system comprising:

(a) an insulated base, the insulated base comprising a first cavity;

(b) a divider, the divider positioned within the first cavity of the insulated base, wherein the divider has an open top end and comprises a sleeve, wherein the divider further comprises a base, the base comprising a planar member coupled to a bottom of the sleeve and extending outwardly therefrom, the divider dividing the first cavity into a second cavity and a plurality of third cavities, the second cavity being centered within the first cavity, the third cavities surrounding the second cavity, the third cavities being triangular in horizontal cross-section and substantially equal in volume to one another;

(c) an outer box, the insulated base being disposed within the outer box; and (d) a quantity of phase-change material disposed within each of the plurality of third cavities.

2. The system as claimed in claim 1 wherein the insulated base is rectangular in horizontal cross-section and has a plurality of corners, wherein the sleeve has a plurality of corners, and wherein the sleeve is rotationally offset relative to the insulated base such that the plurality of corners of the sleeve are not aligned with the plurality of corners of the insulated base.

3. The system as claimed in claim 2 wherein the sleeve is rotationally offset relative to the insulated base by 45 degrees.

4. The system as claimed in claim 2 wherein the sleeve is rotationally offset relative to the insulated base by 22 degrees.

5. The system as claimed in claim 2 wherein the first cavity is square in horizontal cross-sectional shape.

6. The system as claimed in claim 2 wherein the plurality of corners of the sleeve are beveled corners in horizontal cross-section.

7. The system as claimed in claim 2 further comprising a guide, the guide coupled to the sleeve and to the insulated base in such a way as to inhibit the sleeve from rotating relative to the insulated base.

8. The system as claimed in claim 7 wherein the insulated base comprises a plurality of side walls, wherein the guide comprises a top panel, and wherein the top panel is dimensioned to engage at least one of the side walls of the insulated base.

9. The system as claimed in claim 8 wherein the top panel is dimensioned to engage all of the side walls of the insulated base.

10. The system as claimed in claim 9 wherein the guide further comprises a bottom panel, the bottom panel being dimensioned to engage two of the side walls of the insulated base.

11. The system as claimed in claim 1 wherein the outer box is formed from a sheet of material of a given thickness, wherein the outer box comprises a plurality of top closure flaps, and wherein at least some of the top closure flaps are folded over and secured to themselves to have a doubled thickness.

12. The system as claimed in claim 1 further comprising a lid assembly, the lid assembly comprising a lid and a top pad, wherein the lid is dimensioned for covering the first cavity, wherein the top pad is secured to an exterior of the lid, and wherein the top pad has at least one cutout.

13. The system as claimed in claim 12 wherein the at least one cutout comprises a handle for use in mounting/removing the lid assembly.

14. The system as claimed in claim 12 wherein the at least one cutout comprises an opening for receiving a data logger and wire.

15. The system as claimed in claim 12 wherein the outer box comprises an interior cavity and at least one top closure flap, the insulated base being disposed within the interior cavity of the outer box, the lid assembly being removably secured to one of the at least one top closure flap.

16. The system as claimed in claim 1 further comprising a baffle, wherein the baffle comprises a flexible polymer bag, wherein the insulated base is removably disposed within the baffle, and wherein the baffle and the insulated base are disposed within the outer box.

17. The system as claimed in claim 16 wherein the insulated base comprises a bottom, a plurality of sides, and an open top, and wherein the baffle is dimensioned to cover substantially all of the bottom and the plurality of sides of the insulated base.

18. The system as claimed in claim 17 wherein the baffle does not cover any of the open top of the insulated base.

19. The system as claimed in claim 17 further comprising a lid assembly, wherein the lid assembly is removably mounted over the open top of the insulated base, and wherein the baffle is further dimensioned to cover at least a portion, but not an entirety, of the lid assembly when the lid assembly is mounted over the open top of the insulated base.

20. The system as claimed in claim 16 further comprising a foam pad, the foam pad positioned within the outer box below the baffle.

21. The system as claimed in claim 1 wherein the phase-change material comprises dry ice pellets.

22. Thesystem as claimed in claim 1 further comprising atray and an additional quantity of phase-change material disposed within the tray, the tray being removably mounted within the insulated base over the divider.

23. The system as claimed in claim 22 wherein the additional quantity of phase-change material comprises dry ice pellets.

24. The system as claimed in claim 22 wherein the tray is shaped to include a pair of integrally-formed handles.

25. The system as claimed in claim 22 wherein the tray comprises a bottom wall and a plurality of side walls and wherein the side walls extend upwardly from the bottom wall and include recesses extending inwardly to facilitate nesting of a plurality of the trays when not in use.

26. The system as claimed in claim 1 wherein the first cavity is rectangular prismatic and uniform in shape and wherein the first cavity is formed by four side walls and a bottom.

27. The system as claimed in claim 2 wherein the system further comprises a guide, the guide comprising a top panel, a side panel, and a bottom panel, the top panel of the guide being disposed over the open top end of the divider and engaging the first cavity at an upper location, the bottom panel of the guide engaging the first cavity at a lower location.

28. The system as claimed in claim 1 wherein the insulated base comprises one or more vacuum insulated panels forming a bottom wall and four side walls.

29. A system for maintaining temperature-sensitive materials within a desired temperature range for a period of time, the system comprising:

(a) an insulated base, the insulated base comprising a first cavity, wherein the first cavity is square in horizontal cross-sectional shape;

(b) a divider, wherein the divider comprises a sleeve, wherein the divider further comprises a base, the base comprising a planar member coupled to a bottom of the sleeve and extending outwardly therefrom, wherein the sleeve has a plurality of beveled corners in horizontal cross-section, and wherein the sleeve is rotationally offset relative to the insulated base such that the plurality of beveled corners of the sleeve are not aligned with the plurality of corners of the insulated base, the divider positioned within the first cavity of the insulated base, the divider dividing the first cavity into a second cavity and a plurality of third cavities, the second cavity being centered within the first cavity, the third cavities surrounding the second cavity, the third cavities being triangular in horizontal cross-section and substantially equal in volume to one another;

(c) a quantity of phase-change material disposed within each of the plurality of third cavities; and (d) an outer box, the insulated base being disposed within the outer box; and (e) wherein the sleeve and the insulated base are dimensioned so that at least some of the beveled corners of the sleeve contact the insulated base.

30. The system as claimed in claim 29 wherein the sleeve and the insulated base are dimensioned so that all of the beveled corners of the sleeve contact the insulated base.

31. A system for maintaining temperature-sensitive materials within a desired temperature range for a period of time, the system comprising:

(a) an insulated base, the insulated base comprising a first cavity, wherein the insulated base comprises a plurality of side walls and a plurality of corners;

(b) a divider, the divider positioned within the first cavity of the insulated base, the di vider dividing the first cavity into a second cavity and a plurality of third cavities, the second cavity being centered within the first cavity, the third cavities surrounding the second cavity, the third cavities being triangular in horizontal cross-section and substantially equal in volume to one another, wherein the divider comprises a sleeve, wherein the sleeve has a plurality of corners and is rotationally offset relative to the insulated base such that the plurality of corners of the sleeve are not aligned with the plurality of corners of the insulated base, wherein the divider further comprises a base, the base coupled to a bottom of the sleeve, and wherein the base of the divider is dimensioned to contact at least one of the side walls of the insulated base, and wherein the base of the divider extends outwardly from the bottom of the sleeve and is dimensioned to contact all of the side walls of the insulated base;

(c) an outer box, the insulated base being disposed within the outer box; and (d) a quantity of phase-change material disposed within each of the plurality of third cavities.

32. A system for maintaining temperature-sensitive materials within a desired temperature range for a period of time, the system comprising:

(a) an insulated base, the insulated base comprising a first cavity of rectangular shape in horizontal cross-section, the first cavity having a plurality of corners;

(b) a divider, the divider positioned within the first cavity of the insulated base, the divider having an open top end and comprising a sleeve, wherein the divider further comprises a base, the base comprising a planar member coupled to a bottom of the sleeve and extending outwardly therefrom, the sleeve being rectangular in horizontal cross-section and having a plurality of corners, the sleeve being offset rotationally relative to the insulated base such that the plurality of corners of the sleeve are not aligned with the plurality of corners of the insulated base, the sleeve being in direct contact with the insulated base to divide the first cavity into a central cavity and a plurality of peripheral cavities;

(c) an outer box, the insulated base being disposed within the outer box; and (d) a quantity of dry ice disposed within each of the plurality of peripheral cavities.

33. The system as claimed in claim 32 wherein the first cavity is square in horizontal cross-section, wherein the sleeve is square in horizontal cross-section, and wherein the peripheral cavities are triangular in horizontal cross-section and generally equal in volume to one another.

34. A system for maintaining temperature-sensitive materials within a desired temperature range for a period of time, the system comprising:

(a) an insulated base, the insulated base comprising a first cavity, wherein the first cavity is square in horizontal cross-section;

(b) a divider, the divider positioned within the first cavity of the insulated base, the divider comprising a sleeve, wherein the divider further comprises a base, the base comprising a planar member coupled to a bottom of the sleeve and extending outwardly therefrom, the sleeve being square in horizontal cross-section, wherein the sleeve has beveled corners and wherein the beveled corners are in direct contact with the insulated base, the sleeve being offset rotationally relative to the insulated base and in direct contact with the insulated base to divide the first cavity into a central cavity and a plurality of peripheral cavities, wherein the peripheral cavities are triangular in horizontal cross-section and generally equal in volume to one another; and (c) an outer box, the insulated base being disposed within the outer box; and (d) a quantity of dry ice disposed within each of the plurality of peripheral cavities.

35. A system for use in maintaining temperature-sensitive materials within a desired temperature range for a period of time, the system comprising:

(a) an insulated base, the insulated base comprising a first cavity;

(b) a divider, the divider positioned within the first cavity of the insulated base, the divider having an open top end and dividing the first cavity into a second cavity and a plurality of third cavities, the second cavity being centered within the first cavity, the third cavities surrounding the second cavity, the third cavities being triangular in horizontal cross-section and substantially equal in volume to one another;

(c) an outer box, the insulated base being disposed within the outer box;

(d) a tray, the tray being disposed within the insulated base over the divider; and (e) a guide, the guide having a portion disposed horizontally within the insulated base between the tray and the divider.

36. The system as claimed in claim 35 further comprising a baffle, wherein the baffle comprises a flexible polymer bag within which the insulated base is removably disposed, the baffle being disposed within the outer box.

37. The system as claimed in claim 36 further comprising a lid, the lid removably covering the insulated base.

38. The system as claimed in claim 35 wherein the insulated base comprises one or more vacuum insulated panels forming a bottom wall and four side walls.

39. A system for maintaining temperature-sensitive materials within a desired temperature range for a period of time, the system comprising:

(a) an insulated base, the insulated base comprising a first cavity;

(b) a divider, the divider positioned within the first cavity of the insulated base, the divider dividing the first cavity into a second cavity and a plurality of third cavities, the second cavity being centered within the first cavity, the third cavities surrounding the second cavity, the third cavities being triangular in horizontal cross-section and substantially equal in volume to one another, wherein the divider comprises a sleeve, the sleeve having an open top end and an open bottom end, wherein the divider further comprises a base, the base being disposed outside the open bottom end of the sleeve but inside the first cavity of the insulated base; and (c) an outer box, the insulated base being disposed within the outer box; and (d) a quantity of phase-change material disposed within each of the plurality of third cavities.

* * * * *